(12) United States Patent
Park et al.

(10) Patent No.: US 10,187,893 B2
(45) Date of Patent: Jan. 22, 2019

(54) METHOD AND APPARATUS FOR CONFIGURING LONG TRAINING FIELD IN WIRELESS LOCAL NETWORK SYSTEM

(71) Applicant: LG ELECTRONICS INC., Seoul (KR)

(72) Inventors: Eunsung Park, Seoul (KR); Dongguk Lim, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 15/490,798

(22) Filed: Apr. 18, 2017

(65) Prior Publication Data

US 2017/0303279 A1    Oct. 19, 2017

Related U.S. Application Data

(60) Provisional application No. 62/352,010, filed on Jun. 19, 2016, provisional application No. 62/347,064, filed on Jun. 7, 2016, provisional application No. 62/344,339, filed on Jun. 1, 2016, provisional application No. 62/330,822, filed on May 2, 2016, provisional application No. 62/324,348, filed on Apr. 19, 2016.

(51) Int. Cl.
*H04W 72/04* (2009.01)
*H04W 24/02* (2009.01)
*H04W 84/12* (2009.01)

(52) U.S. Cl.
CPC ....... *H04W 72/0453* (2013.01); *H04W 24/02* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 8,923,282 B2* | 12/2014 | Sampath | ............. | H04L 25/0232 370/328 |
| 8,976,674 B2* | 3/2015 | Pare, Jr. | ............. | H04L 27/0012 370/241 |
| 10,038,535 B2* | 7/2018 | Chun | ..................... | H04W 84/12 |
| 2010/0265408 A1* | 10/2010 | Katsube | ................... | H04L 1/18 348/723 |
| 2010/0284393 A1* | 11/2010 | Abraham | ............. | H04L 5/0023 370/343 |
| 2011/0110443 A1* | 5/2011 | Kwon | ................. | H04L 27/0012 375/260 |

(Continued)

*Primary Examiner* — Bunjob Jaroenchonwanit
(74) *Attorney, Agent, or Firm* — Lee, Hong, Degerman, Kang & Waimey PC

(57) ABSTRACT

Provides are a method and apparatus for configuring an LTF sequence in a wireless LAN system. More specifically, a transmission apparatus generates an LTF sequence corresponding to a first frequency band. The transmission apparatus sends an LTF sequence corresponding to the first frequency band to a reception apparatus. In this case, an LTF sequence corresponding to the second 106-RU of a second frequency band is used as a sequence located in the second 106-RU of the second frequency band in the LTF sequence corresponding to the first frequency band. The transmission apparatus may apply a phase shift of 180° to the LTF sequence corresponding to the second 106-RU of the second frequency band.

10 Claims, 16 Drawing Sheets

(56) References Cited

U.S. PATENT DOCUMENTS

| | | | |
|---|---|---|---|
| 2012/0195328 A1* | 8/2012 | Otsuka | H04L 7/041 370/478 |
| 2012/0263141 A1* | 10/2012 | Taghavi Nasrabadi | H04W 72/02 370/330 |
| 2012/0269124 A1* | 10/2012 | Porat | H04W 72/1231 370/328 |
| 2013/0142115 A1* | 6/2013 | Yu | H04W 56/00 370/328 |
| 2013/0230120 A1* | 9/2013 | Yang | H04L 27/2613 375/295 |
| 2013/0272198 A1* | 10/2013 | Azizi | H04W 72/02 370/328 |
| 2013/0279439 A1* | 10/2013 | Takahashi | H04L 27/2623 370/329 |
| 2013/0315326 A1* | 11/2013 | Shi | H04B 7/0413 375/267 |
| 2014/0153507 A1* | 6/2014 | Yang | H04L 27/2602 370/329 |
| 2015/0131527 A1* | 5/2015 | Kenney | H04L 27/2613 370/328 |
| 2015/0181501 A1* | 6/2015 | Soga | H04W 40/16 370/252 |
| 2015/0189653 A1* | 7/2015 | Yu | H04L 27/2657 370/338 |
| 2015/0288555 A1* | 10/2015 | Kanno | H04L 27/2613 370/350 |
| 2016/0100396 A1* | 4/2016 | Seok | H04L 5/003 370/329 |

* cited by examiner

FIG. 1
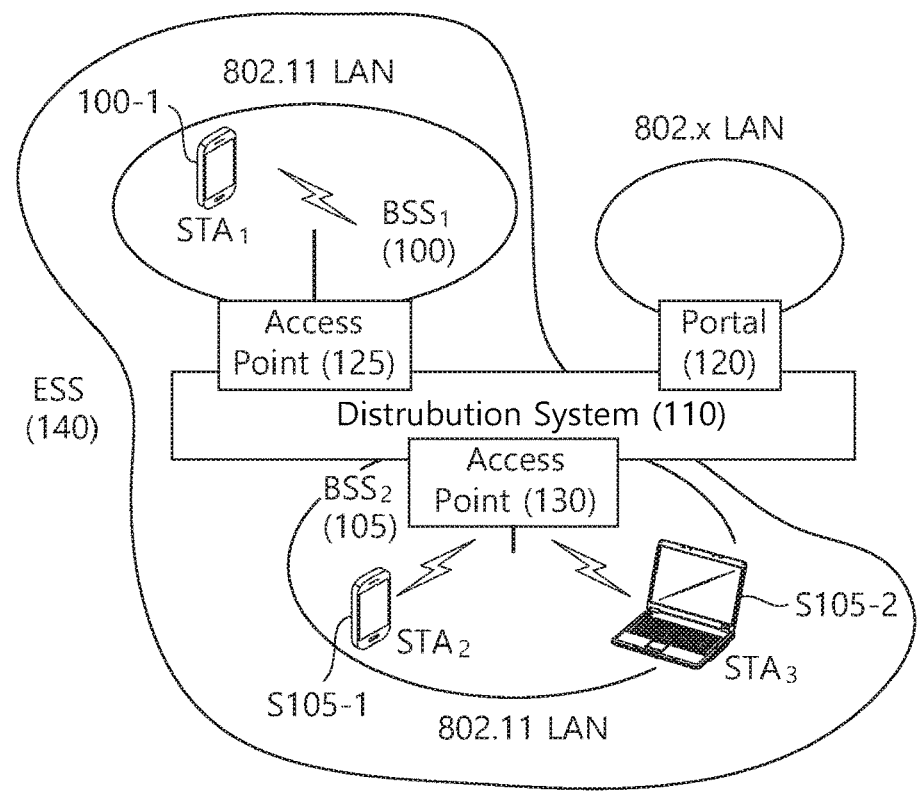
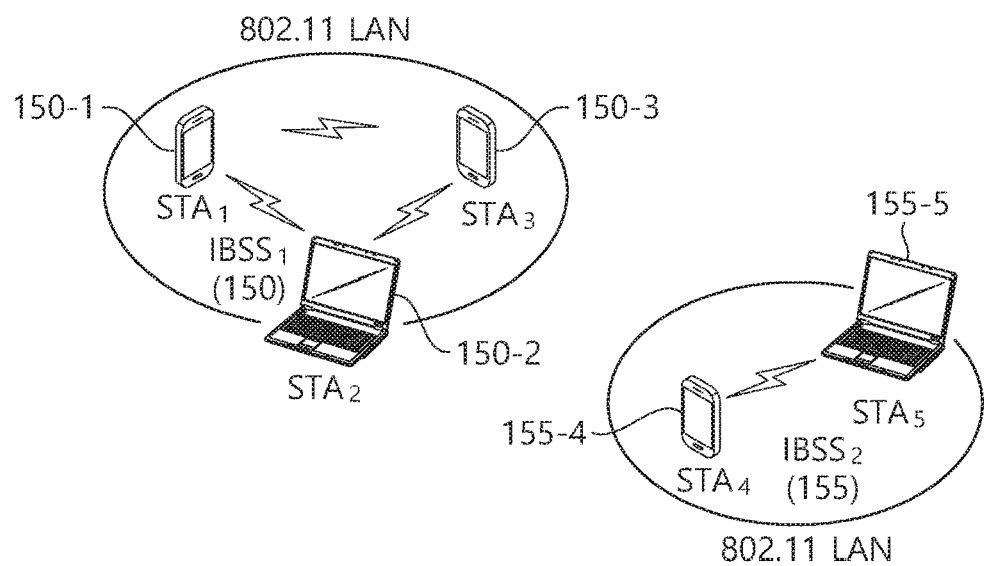

METHOD AND APPARATUS FOR CONFIGURING LONG TRAINING FIELD IN WIRELESS LOCAL NETWORK SYSTEM

CROSS-REFERENCE TO RELATED APPLICATIONS

Pursuant to 35 U.S.C. § 119(e), this application claims the benefit of U.S. Provisional Patent Application Nos. 62/324,348, filed on Apr. 19, 2016, 62/330,822, filed on May 2, 2016, 62/344,339, filed on Jun. 1, 2016, 62/347,064, filed on Jun. 7, 2016 and 62/352,010, filed on Jun. 19, 2016, the contents of which are all hereby incorporated by reference herein in their entirety.

BACKGROUND OF THE INVENTION

Field of the Invention

The present invention relates to a training signal that is being used in a wireless LAN system and, more particularly, to a method and apparatus for configuring a long training field (LTF) in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Furthermore, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). The directionality of next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

An object of the present description is to provide a method of configuring an LTF in a wireless LAN system and a device using the same.

An example of this specification proposes a transmission method which may be applied to a wireless LAN system, and more specifically, proposes a method and apparatus for generating an LTF signal which supports at least any one of a plurality of frequency bands supported in a wireless LAN system.

A transmission apparatus according to an example of this specification generates a long training field (LTF) signal corresponding to a first frequency band and sends a physical protocol data unit (PPDU) including the LTF signal to a reception apparatus.

For example, the transmission apparatus generates a long training field (LTF) sequence corresponding to the first frequency band (e.g., a 40 MHz band). In this case, an LTF sequence corresponding to the second 106-RU of a second frequency band may be used as a sequence located in the second 106-RU of the second frequency band in the LTF sequence corresponding to the first frequency band.

In this case, the second frequency band may be located in the second subband of the first frequency band. Furthermore, the reception apparatus may have only the capability of the second frequency band. The 106-RU may be a frequency radio unit (RU) having 106 subcarriers. In this case, the first, the second may be determined in order of lower tone index in the first frequency band and the second frequency band.

In other words, the sequence located in the second 106-RU of ol the second subband of the first frequency band may be substituted with an LTF sequence corresponding to the second 106-RU of the second frequency band.

If the bandwidth of the first frequency band is 40 MHz and the bandwidth of the second frequency band is 20 MHz, the LTF sequence corresponding to the first frequency band is defined as follow.

{+1, −1, −1, −1, −1, −1, +1, +1, −1, −1, +1, −1, +1, −1,

−1, −1, −1, −1, −1, +1, +1, +1, +1, −1, +1, −1, +1, +1,

−1, −1, −1, −1, −1, +1, +1, −1, −1, +1, −1, +1, −1, +1,

+1, +1, +1, +1, −1, −1, −1, −1, +1, −1, +1, −1, +1, +1,

+1, +1, +1, −1, +1, −1, −1, +1, −1, +1, −1, −1, +1, +1,

+1, +1, +1, −1, −1, +1, +1, −1, +1, −1, +1, +1, +1,

+1, +1, +1, −1, −1, −1, −1, +1, −1, +1, −1, −1, −1,

−1, −1, −1, −1, +1, +1, −1, −1, +1, −1, +1, −1, +1,

+1, +1, +1, +1, −1, −1, −1, −1, +1, −1, +1, −1, 0, 0,

0, −1, −1, −1, −1, −1, +1, +1, −1, −1, +1, −1, +1, −1,

−1, −1, −1, −1, −1, +1, −1, +1, +1, −1, +1, −1, +1, +1,

+1, +1, +1, +1, +1, −1, −1, +1, +1, −1, +1, −1, +1, −1,

−1, −1, −1, −1, +1, −1, +1, +1, −1, +1, −1, +1, +1, +1,

+1, +1, +1, +1, −1, −1, +1, +1, −1, +1, −1, +1, −1 + 1,

+1, −1, −1, +1, −1, +1, +1, +1, +1, −1, +1, −1, +1, +1,

−1, −1, +1, −1, −1, −1, −1, −1, +1, −1, +1, +1, −1,

−1, +1, +1, −1, +1, −1, −1, −1, −1, +1, −1, +1, +1,

+1, −1, −1, +1, −1, −1, −1, −1, −1, +1, −1, +1, +1}

The LTF sequence corresponding to the second 106-RU of the second frequency band may be defined as follows.

$$\{+1, +1, -1, -1, +1, -1, +1, +1, +1, +1, -1, +1, -1, +1,$$
$$+1, -1, -1, +1, -1, -1, -1, -1, -1, +1, -1, +1, +1,$$
$$-1, -1, +1, +1, -1, +1, -1, -1, -1, -1, +1, -1, +1,$$
$$+1, +1, -1, -1, +1, -1, -1, -1, -1, -1, +1, -1, +1\}$$

Furthermore, if a phase shift of 180° is applied to the LTF sequence corresponding to the second 106-RU of the second frequency band, the LTF sequence corresponding to the first frequency band may be defined as follows.

$$\{+1, -1, -1, -1, -1, -1, +1, +1, -1, -1, +1, -1, +1, -1,$$
$$-1, -1, -1, -1, -1, +1, +1, +1, +1, -1, +1, -1, +1, +1,$$
$$-1, -1, -1, -1, -1, +1, +1, -1, -1, +1, -1, +1, -1, +1,$$
$$+1, +1, +1, +1, -1, -1, -1, -1, +1, -1, +1, -1, +1, +1,$$
$$+1, +1, +1, -1, +1, -1, -1, +1, -1, +1, -1, -1, +1, +1,$$
$$+1, +1, +1, -1, -1, +1, +1, -1, +1, -1, +1, +1, +1,$$
$$+1, +1, +1, -1, -1, -1, -1, +1, -1, +1, -1, -1, -1,$$
$$-1, -1, -1, -1, +1, +1, -1, -1, +1, -1, +1, -1, +1,$$
$$+1, +1, +1, +1, -1, -1, -1, -1, +1, -1, +1, -1, 0, 0,$$
$$0, -1, -1, -1, -1, -1, +1, +1, -1, -1, +1, -1, +1, -1,$$
$$-1, -1, -1, -1, -1, +1, -1, +1, +1, -1, +1, -1, +1, +1,$$
$$+1, +1, +1, +1, +1, -1, -1, +1, +1, -1, +1, -1, +1, -1,$$
$$-1, -1, -1, -1, +1, -1, +1, +1, -1, +1, -1, +1, +1,$$
$$+1, +1, +1, +1, +1, -1, -1, +1, +1, -1, +1, -1, +1,$$
$$-1^*[+1, +1, -1, -1, +1, -1, +1, +1, +1, +1, -1, +1, -1, +1,$$
$$+1, -1, -1, +1, -1, -1, -1, -1, +1, -1, +1, +1, -1,$$
$$-1, +1, +1, -1, +1, -1, -1, -1, -1, +1, -1, +1, +1,$$
$$+1, -1, -1, +1, -1, -1, -1, -1, -1, +1, -1, +1], +1\}$$

The LTF sequence corresponding to the first frequency band may be disposed at intervals of 2 tones from the lowest tone having a tone index of −244 to the highest tone having a tone index of +244.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
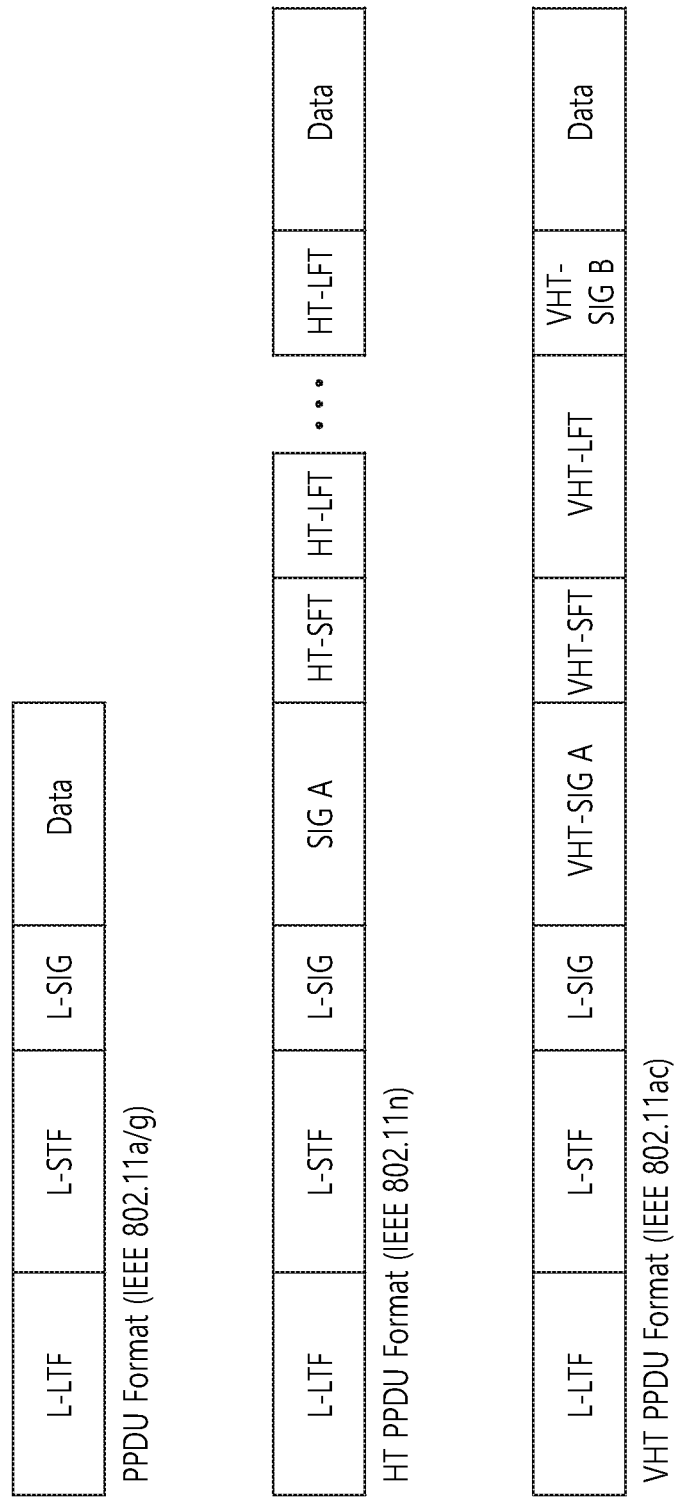
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may join one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

The term user may be used in diverse meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (i.e., 4 or 8 μs).

More detailed description of the respective fields of FIG. 3 will be made below.

Figure 4:
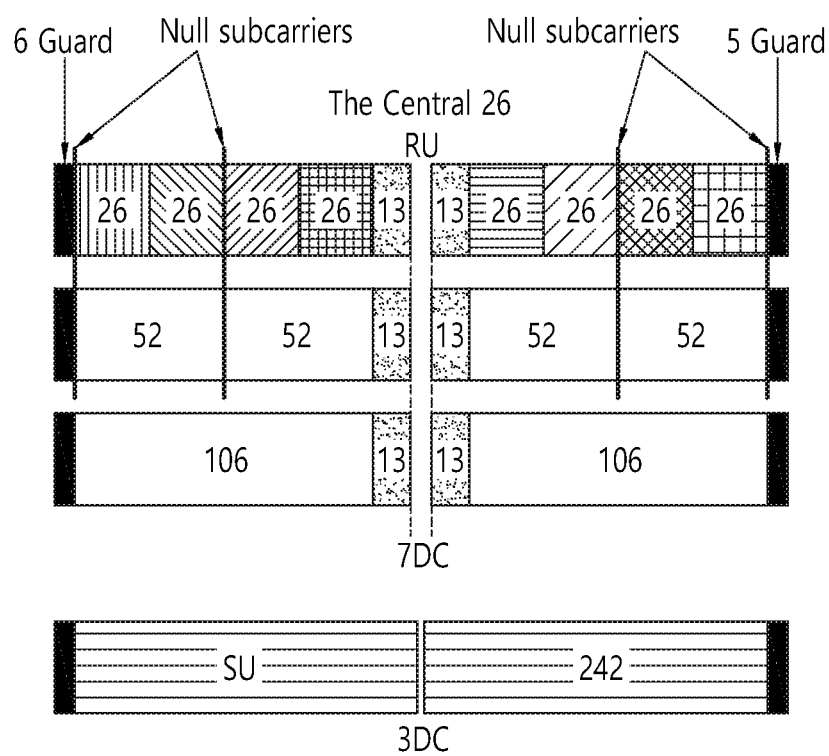
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (i.e., subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (i.e., units corresponding to 26 tones). 6 tones may be used as a guard band in a leftmost band of the 20 MHz band and 5 tones may be used as the guard band in a rightmost band of the 20 MHz band. Furthermore, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

The RU layout of FIG. 4 may be used even in a situation for a single user (SU) in addition to multiple users (MUs). In this case, as illustrated at the bottom of FIG. 4, one 242-unit may be used and three DC tones may be inserted.

In one example of FIG. 4, RUs having various sizes, that is, a 26-RU, a 52-RU, a 106-RU, a 242-RU, are proposed. As a result, since detailed sizes of the RUs may extend or increase, the embodiment is not limited to a detailed size (i.e., the number of corresponding tones) of each RU.

Figure 5:
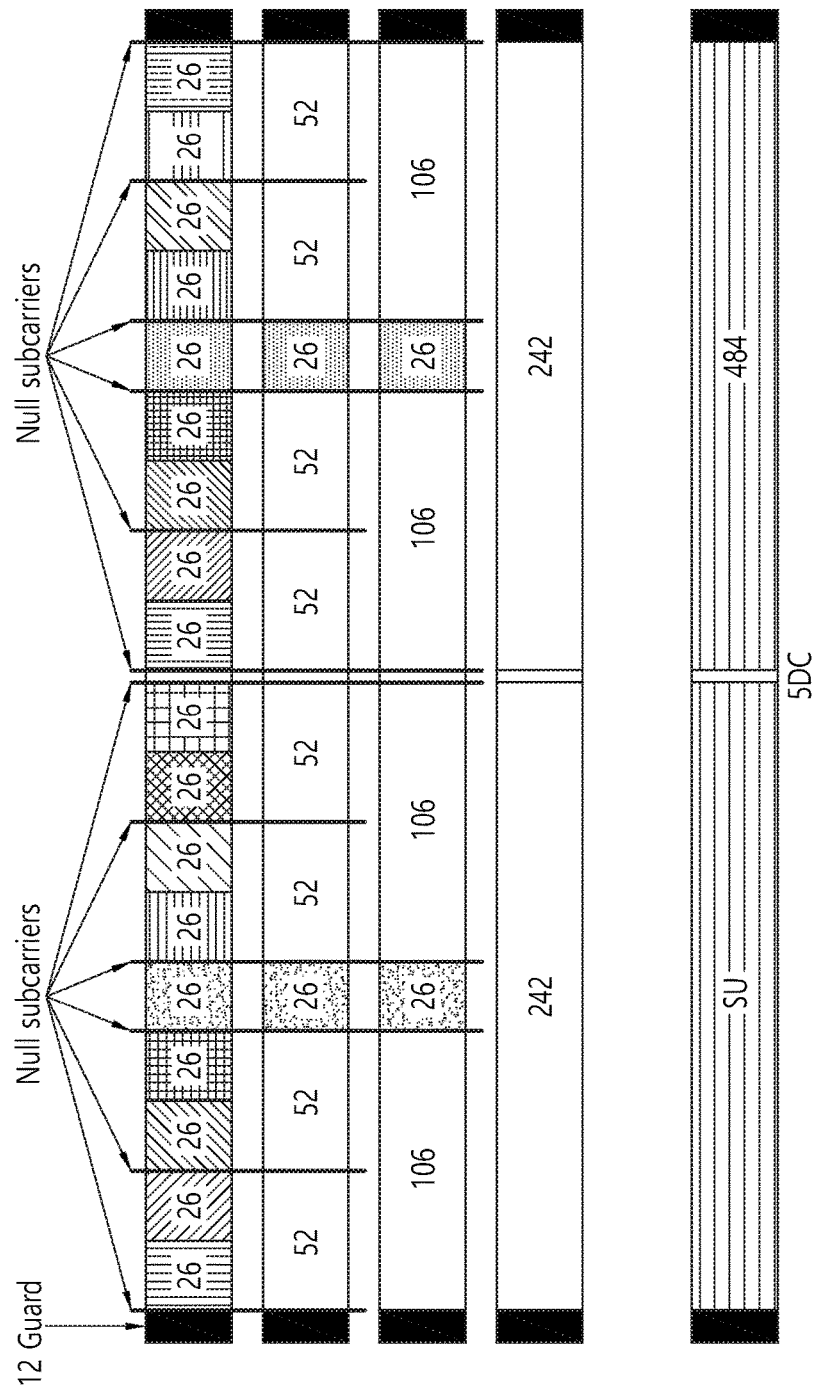
FIG. 5 is a diagram illustrating a layout of RUs used in a band of 40 MHz.

FIG. 5 is a diagram illustrating a layout of resource units (RUs) used in a band of 40 MHz.

As in the case where the RUs having various RUs are used in one example of FIG. 4, 26-RU, 52-RU, 106-RU, 242-RU, 484-RU, and the like may be used even in one example of FIG. 5. Furthermore, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
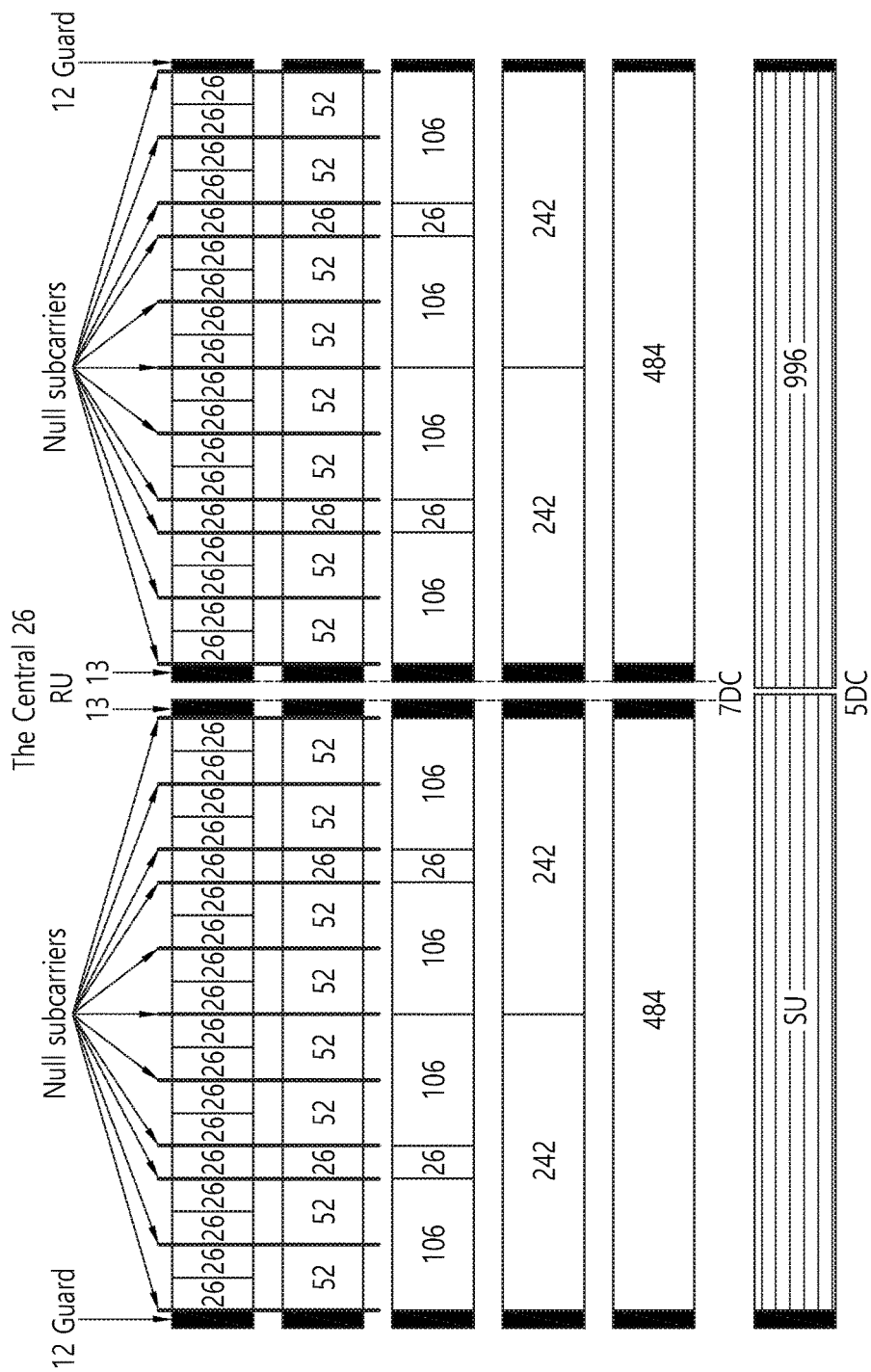
FIG. 6 is a diagram illustrating a layout of RUs used in a band of 80 MHz.

FIG. 6 is a diagram illustrating a layout of resource units (RUs) used in a band of 80 MHz.

As in the case where the RUs having various RUs are used in one example of each of FIG. 4 or 5, 26-RU, 52-RU, 106-RU, 242-RU, 484-RU, and the like may be used even in one example of FIG. 6. Furthermore, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. The detailed number of RUs may be modified similarly to one example of each of FIG. 4 or 5.

Figure 7:
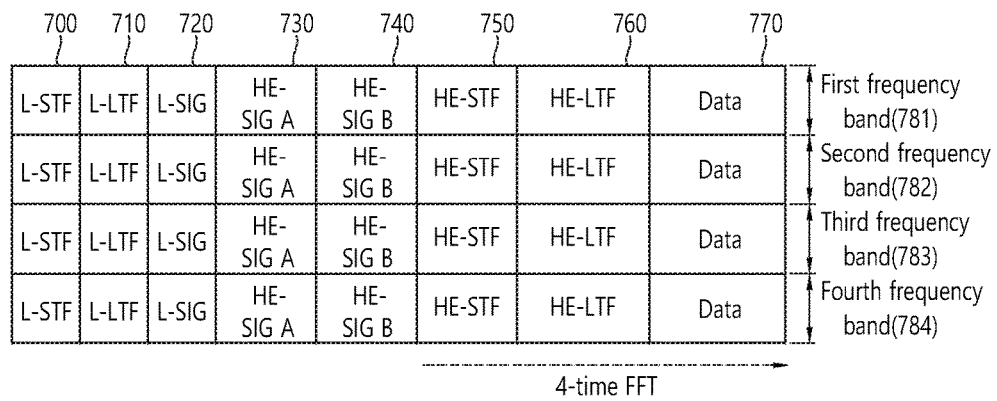
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Furthermore, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Furthermore, some fields of the HE-SIG-A may be partially added or omitted in other environments other than a multi-user (MU) environment.

An HE-SIG-B 740 may be included only in the case of the PPDU for the multiple users (MUs) as described above. In principle, an HE-SIG-A 750 or an HE-SIG-B 760 may include resource allocation information (alternatively, virtual resource allocation information) for at least one receiving STA.

Figure 8:
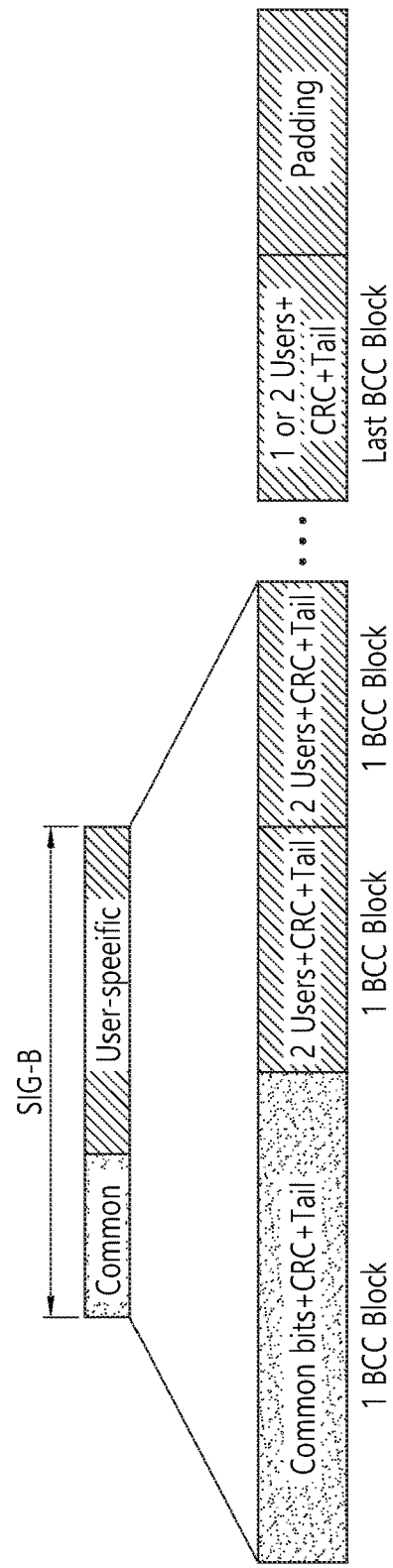
FIG. 8 is a block diagram illustrating one example of HE-SIG-B.

FIG. 8 is a block diagram illustrating one example of HE-SIG-B.

As illustrated in FIG. 8, the HE-SIG-B field includes a common field at the frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (i.e., the fourth frequency band) and a data field of another frequency band (e.g., a second frequency band) other than the corresponding frequency band. Furthermore, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having the size of 312.5 kHz, which is legacy subcarrier spacing may be applied to the first field of the HE PPDU and a subcarrier space having the size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For the simplicity of a description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

A user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a term called downlink data (alternatively, a downlink frame) and data (alternatively, a frame) which the STA transmits to the AP may be expressed as a term called uplink data (alternatively, an uplink frame). Furthermore, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Furthermore, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Furthermore, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. More specifically, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively subchannels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Furthermore, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Furthermore, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, when the uplink transmission by the plurality of respective STAs (e.g., non-AP STAs) is performed on the frequency domain, the AP may allocate the different frequency resources to the plurality of respective STAs as the uplink transmission resources based on the OFDMA. Furthermore, as described above, the different frequency resources may be different subbands (alternatively, sub channels) or different resources units (RUs).

The different frequency resources are indicated through a trigger frame with respect to the plurality of respective STAs.

Figure 9:
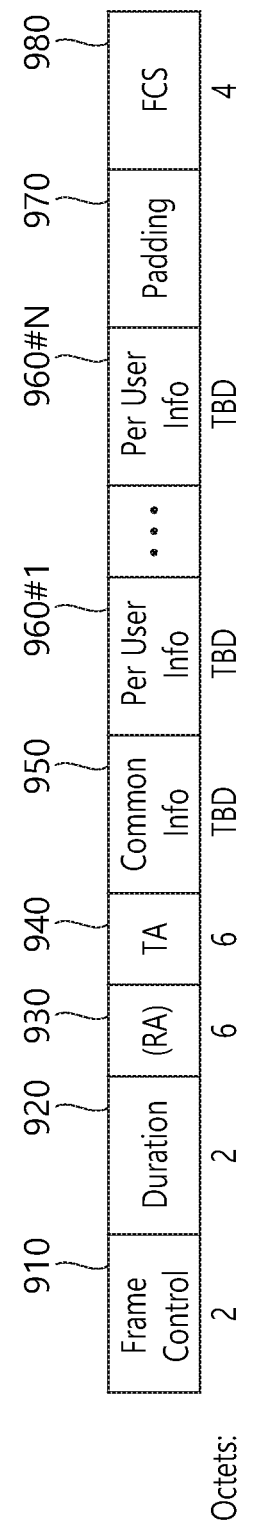
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

Additionally, a RA field 930 may include address information of a receiving STA of the corresponding trigger frame, and this field may also be omitted as required. A TA field 940 may include address information of the STA (e.g., AP) transmitting the corresponding trigger frame, and a common information field 950 may include common control information that is applied to the receiving STA receiving the corresponding trigger frame.

Figure 10:
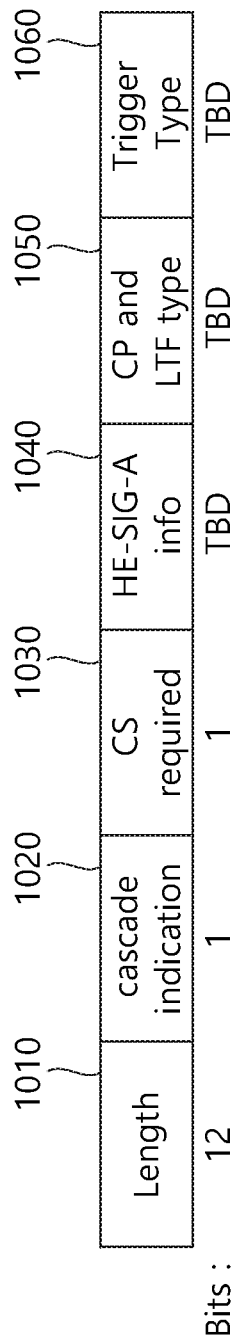
FIG. 10 illustrates an example of a common information field.

FIG. 10 illustrates an example of a common information field. Among the sub-fields of FIG. 10, some may be omitted, and other additional sub-fields may also be added. Additionally, the length of each of the sub-fields shown in the drawing may be varied.

As shown in the drawing, the Length field 1010 may be given that same value as the Length field of the L-SIG field of the uplink PPDU, which is transmitted with respect to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

An HE-SIG-A information field 1040 may include information that controls the contents of a SIG-A field (i.e., HE-SIG-A field) of an uplink PPDU, which is being transmitted with respect to the corresponding trigger frame.

A CP and LTF type field 1050 may include information on an LTF length and a CP length of the uplink PPDU being transmitted with respect to the corresponding trigger frame. A trigger type field 1060 may indicate a purpose for which the corresponding trigger frame is being used, e.g., general triggering, triggering for beamforming, and so on, a request for a Block ACK/NACK, and so on.

The remaining description on FIG. 9 will be additionally provided as described below.

It is preferable that the trigger frame includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 11:
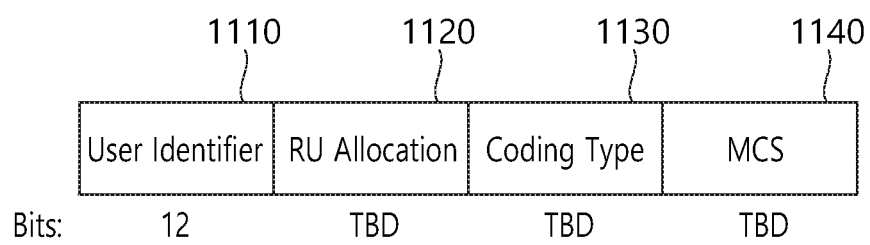
FIG. 11 illustrates an example of a sub-field being included in each user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

Additionally, a RU Allocation field 1120 may be included in the sub-field of the per user information field. More specifically, in case a receiving STA, which is identified by the User Identifier field 1110, transmits an uplink PPDU with respect to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted with respect to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted with respect to the trigger frame of FIG. 9.

Figure 12:
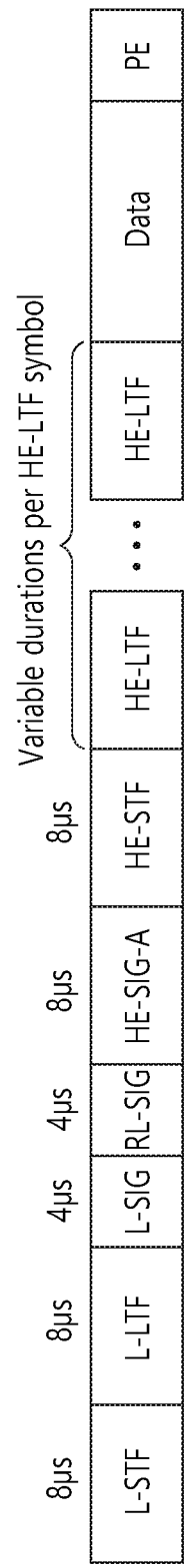
FIG. 12 is a block diagram illustrating an example of an uplink MU PPDU.

FIG. 12 is a block diagram illustrating an example of an uplink MU PPDU. The uplink MU PPDU of FIG. 12 may be transmitted with respect to the aforementioned trigger frame.

As shown in the drawing, the PPDU of FIG. 12 includes diverse fields, and the fields included herein respectively correspond to the fields shown in FIGS. 2, 3, and 7. As shown in the drawing, the uplink PPDU of FIG. 12 may not include a HE-SIG-B field and may only include a HE-SIG-A field.

In the related art wireless LAN system, the P matrix (or orthogonal mapping matrix) that is being applied to the LTF field has been defined as described below.

More specifically, in the 802.11ac system, residual carrier frequency offset (CFO) is measured by using a pilot. More specifically, residual CFO may be measured by allocating the same pilot to the same tone (or subcarrier) for each symbol, by configuring the same coefficient, and by measuring a phase difference in the pilot values between the symbols.

Additionally, the channel estimation is carried out in the VHT-LTF, and orthogonality between the symbols of the same subcarrier and the streams is created by multiplying a P matrix, and, then, the channel may be measured by using the orthogonality. The P matrix may represent a matrix having orthogonality for each row configuring the corresponding matrix.

In this case, the number of LTF fields and the total number of spatial streams (i.e., space-time streams) may be defined as the relationship shown below in Table 1.

TABLE 1

| Number of streams | 1 | 2 | 3 | 4 | 5 | 6 | 7 | 8 |
|---|---|---|---|---|---|---|---|---|
| Number of LTFs | 1 | 2 | 4 | 4 | 6 | 6 | 8 | 8 |

In this case, the number of LTF fields and the total number of spatial streams (i.e., space-time streams) may be defined as the relationship shown below in Table 1.

The P matrix may be defined as different matrices in accordance with the total number of space-time streams, and the detailed format of the matrix may be as described below. More specifically, if the total number of space-time streams is equal to or less than 4, Equation 1 is used, and, if the total number of space-time streams is equal to 5 or 6, Equation 2 is used, and, if the total number of space-time streams is equal to 7 or 8, Equation 3 is used.

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \text{[Equation 1]}$$

$$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix} \quad \text{[Equation 2]}$$

where $w = \exp(-j2\pi/6)$ $$P_{8\times 8} = \begin{bmatrix} P_{4\times 4} & P_{4\times 4} \\ P_{4\times 4} & -P_{4\times 4} \end{bmatrix} \quad \text{[Equation 3]}$$

For example, in the IEEE 802.11ac system, in case Equation 1 is used in order to configure the VHT-LTF field, a method in which i) a first LTF symbol of a first space-time stream is multiplied by "1", a second LTF symbol is multiplied by "−1", and the remaining two LTF symbols are multiplied by "1", ii) first, second, and fourth LTF symbols of a second space-time stream are multiplied by "1", and a third LTF symbol is multiplied by "−1", iii) first, second, and third LTF symbols of a third space-time stream are multiplied by "1", and a fourth LTF symbol is multiplied by "−1", and iv) second, third, and fourth LTF symbols of a fourth space-time stream are multiplied by "1", and a first LTF symbol is multiplied by "−1", may be used.

More specifically, the LTF sequence by which the P matrix is multiplied is defined as a binary sequence that is shown below.

More specifically, LTF_left and LTF_right sequences are defined as shown below.

LTF_left={1,1,−1,−1,1,1,−1,1,−1,1,1,1,1,1,1,−1,−1,1,
1,−1,1,−1,1,1,1,1}  [Equation 4]

LTF_right={1,−1,−1,1,1,−1,1,−1,1,1,−1,−1,−1,−1,1,1,
1,−1,−1,1,−1,1,−1,1,1,1,1}  [Equation 5]

In the VHT system, a VHT-LTF sequence for a 20 MHz transmission is defined as shown below.

VHTLTF_20(−28,28)={1,1,LTF_left,0,LTF_right,−1,−1}  [Equation 6]

More specifically, the frequency band for the 20 MHz transmission corresponds to frequency indexes "−28" to "28", and, as shown in Equation 6, the frequency band is defined as the LTF_left and LTF_right sequences, additional binary values, and a DC value "0".

In the VHT system, a VHT-LTF sequence for a 40 MHz transmission is defined as shown below.

VHTLTF_40(−58,58)={LTF_left,1,LTF_right,−1,
−1,−1,1,0,0,0,−1,1,1,−1,LTF_left,1,LTF_right}  [Equation 7]

More specifically, the frequency band for the 40 MHz transmission corresponds to frequency indexes "−58" to "58", and, as shown in Equation 7, the frequency band is defined as the LTF_left and LTF_right sequences, additional binary values, and a DC value "0".

In the VHT system, a VHT-LTF sequence for a 40 MHz transmission is defined as shown below.

In the VHT system, a VHT-LTF sequence for a 80 MHz transmission is defined as shown below.

VHTLTF_80(−122,122)={LTF_left,1,LTF_right,
−1,−1,−1,1,1,−1,1,−1,1,1,−1,LTF_left,1,
LTF_right,1,−1,1,−1,0,0,0,1,−1,−1,1,LTF_left,
1,LTF_right,−1,−1,−1,1,1,−1,1,−1,1,1,1,−1,
LTF_left,1,LTF_right}  [Equation 8]

More specifically, the frequency band for the 80 MHz transmission corresponds to frequency indexes "−122" to "122", and, as shown in Equation 8, the frequency band is defined as the LTF_left and LTF_right sequences, additional binary values, and a DC value "0".

In the VHT system, a VHT-LTF sequence for a 160 MHz transmission is defined as shown below.

VHTLTF_160(−250,250)={VHTLTF(−122,122),0,0,
0,0,0,0,0,0,0,0,0,VHTLTF(−122,122)}  [Equation 9]

More specifically, the frequency band for the 160 MHz transmission corresponds to frequency indexes "−250" to "250", and, as shown in Equation 9, the frequency band is defined as a structure of repeating the VHT-LTF sequence for the 80 MHz transmission.

In the following example, an example of the aforementioned Equation 4 to Equation 9 may be re-used for the HE-LTF sequence. In this case, the VHT-LTF sequence that is being re-used may correspond to a sequence having a gamma value applied thereto or may correspond to a sequence not having a gamma value applied thereto. For example, in the VHT system, for a decrease in PAPR of a STF or LTF, an operation of rotating a tone by using an orthogonal sequence, such as $\{1, j\}$, $\{1, -1\}$, and so on, may be performed. Hereinafter, the sequences VHTLTF_20, VHTLTF_40, VHTLTF_80, VHTLTF_160, and so on, which are being applied to the following equations, may each correspond to a sequence having a gamma value applied thereto or a sequence not having a gamma value applied thereto.

Hereinafter, in this specification, an HE LTF sequence that is available for usage in a HE PPDU will be proposed. As shown in FIG. 7, and so on, not only 1×FFT but also 2×FFT or 4×FFT may be applied to a HE-LTF 760. More specifically, as compared to a legacy field of the HE PPDU, a FFT/IFFT having a size that is 2 or 4 times larger may be applied, and, accordingly, the subcarrier spacing may be ½ times or ¼ times the subcarrier spacing that was used in the conventional wireless LAN system.

More specifically, an IEEE802.11ax system or a HEW system may use a HE-LTF having a length that is 2 times or 4 times longer for each bandwidth as compared with the conventional 11ac system or VHT system.

The following specification proposes an HE-LTF sequence which is effective in terms of the PAPR and applied to 1×FFT, 2×FFT or 4×FFT.

Example (1)—1× HE-LTF

An example of a 1× HE-LTF is proposed hereinafter. More specifically, the following example (1) proposes a variety of types of LTF sequences for 20 MHz, 40 MHz and 80 MHz transmission.

1-A) 20 MHz

A detailed example of HELTF_1×,20 is as follows.

$$\text{HELTF\_1x, 20}(-120:4:120) = \quad \text{[Equation 10]}$$
$$\{-1, +1, +1, -1, +1, -1, +1, +1, +1, +1, -1,$$
$$-1, +1, +1, +1, -1, -1, -1, +1, -1, -1,$$
$$+1, +1, -1, -1, +1, -1, -1, +1, -1, 0,$$
$$-1, +1, +1, +1, +1, +1, +1, -1, -1, -1,$$
$$-1, -1, +1, -1, -1, -1, +1, -1, -1, +1,$$
$$-1, -1, +1, -1, +1, -1, -1, -1, -1, -1\}$$

In Equation 10, "(−120:4:120)" means that a sequence is inserted from a frequency index "−120" to a frequency index "120" at intervals of a frequency index "4." Furthermore, "HELTF_1×,20" means 1× HELTF for HE LTF sequences for 20 MHz transmission. The following display method is applied to the following equations in the same manner.

The example may be changed in such a way as to insert a sequence element "0" into a DC index and the left/right indices thereof as described below. A sequence that belongs to the HE LTF sequences and that corresponds to the left area (i.e., area corresponding to a negative frequency index) of the DC index is referred to as a "negative sequence." A sequence that belongs to the HE LTF sequences and that corresponds to the right area (i.e., area corresponding to a positive frequency index) of the DC index is referred to as a "positive sequence."

1-B) 40 MHz

The length of each of negative and positive sequences for HELTF_1×,40 may be 244. A detailed example of HELTF_1×,40 is as follows.

$$\text{HELTF\_1x, 40}(-244:4:244) = \quad \text{[Equation 11]}$$
$$\{+1, +1, +1, +1, -1, +1, +1, -1, -1, +1, -1,$$
$$+1, -1, +1, -1, -1, +1, -1, +1, +1, +1, -1,$$
$$-1, +1, +1, +1, +1, +1, +1, +1, +1, -1,$$
$$+1, +1, -1, -1, +1, -1, +1, -1, +1, -1,$$
$$-1, +1, -1, +1, +1, +1, -1, -1, +1, +1,$$
$$+1, +1, -1, +1, -1, +1, -1, -1, -1, 0, +1,$$
$$+1, -1, -1, +1, -1, +1, +1, +1, +1, +1,$$
$$+1, -1, +1, +1, -1, -1, +1, -1, +1, +1,$$
$$+1, +1, +1, -1, +1, -1, -1, -1, +1, +1,$$
$$-1, -1, -1, +1, -1, -1, -1, -1, +1, -1,$$
$$-1, +1, +1, -1, +1, -1, -1, -1, -1, -1,$$
$$+1, -1, +1, +1, +1, -1, -1, +1, +1, +1\}$$

1-C) 80 MHz

The length of each of negative and positive sequences for HELTF_1×,80 may be 500. A detailed example of HELTF_1×,80 is as follows.

$$\text{HELTF\_1x, 80}(-500:4:500) = \quad \text{[Equation 12]}$$
$$\{-1, -1, +1, +1, +1, +1, +1, -1, -1, -1, +1,$$
$$+1, -1, -1, +1, -1, +1, -1, -1, -1, -1, -1,$$
$$-1, +1, +1, -1, -1, +1, -1, +1, -1, -1, -1,$$
$$-1, -1, +1, +1, -1, -1, +1, -1, +1, -1, +1,$$
$$+1, +1, +1, +1, -1, -1, +1, +1, -1, +1, -1,$$
$$+1, -1, -1, -1, -1, +1, -1, -1, -1, -1,$$
$$-1-1, +1, +1, +1, -1, -1, +1, +1, -1, +1,$$
$$-1, +1, +1, +1, +1, +1, +1, -1, -1, +1, +1,$$
$$-1, +1, -1, +1, +1, +1, -1, +1, +1, -1,$$
$$-1, +1, -1, +1, +1, +1, +1, +1, +1, -1,$$
$$-1, +1, +1, -1, +1, -1, +1, -1, -1, -1,$$
$$-1, +1, -1, +1, -1, -1, 0, -1, +1, +1, -1,$$
$$-1, +1, +1, -1, -1, +1, +1, -1, +1, -1,$$
$$+1, +1, +1, +1, +1, +1, -1, -1, +1, +1,$$
$$-1, +1, -1, +1, +1, +1, +1, +1, -1, -1,$$
$$+1, +1, -1, +1, -1, +1, -1, -1, +1, -1,$$
$$-1, +1, +1, -1, -1, +1, -1, +1, -1, +1,$$
$$+1, +1, +1, -1, +1, -1, -1, +1, -1, -1,$$
$$+1, +1, +1, -1, -1, +1, +1, -1, +1, -1,$$

-continued
+1, +1, +1, +1, +1, +1, −1, −1, +1, +1, −1,

+1, −1, +1, +1, +1, +1, −1, +1, +1, −1,

−1, +1, −1, +1, −1, +1, +1, +1, +1, +1,

−1, −1, +1, +1, −1, +1, −1, +1, −1, −1,

−1, −1, +1, −1, +1, −1, −1, −1, +1, +1}

Example (2)—2× HE-LTF

An example of a 2× HE-LTF is proposed hereinafter. More specifically, the following example (2) proposes a variety of types of LTF sequences for 20 MHz, 40 MHz and 80 MHz transmission.

2-A) 20 MHz

In the case of the 2× HE LTF, the size of an applied FFT block is increased every two times compared to the VHT LTF. The length of each of negative and positive sequences for HELTF_2×,20 may be 122. A detailed example of HELTF_2×,20 is as follows.

HELTF_2x, 20(−122:2:122) =     [Equation 13]

{−1, −1, −1, +1, +1, −1, +1, −1, −1, −1, −1,

+1, −1, +1, −1, −1, +1, +1, −1, +1, +1, +1,

+1, +1, −1, +1, −1, +1, −1, −1, +1, +1,

−1, +1, −1, −1, −1, −1, +1, −1, +1, +1,

+1, −1, −1, +1, −1, −1, −1, −1, −1, +1,

−1, −1, −1, +1, +1, +1, −1, −1, +1, 0, +1,

−1, +1, +1, −1, +1, +1, −1, +1, +1, −1,

−1, +1, −1, +1, +1, +1, +1, −1, +1, −1,

+1, +1, −1, −1, +1, −1, −1, −1, −1, −1,

+1, −1, +1, +1, −1, −1, +1, +1, −1, +1,

−1, −1, −1, −1, +1, −1, +1, +1, +1, −1,

−1, +1, −1, −1, −1, −1, −1, +1, −1, +1}

2-B) 40 MHz

The length of each of negative and positive sequences for HELTF_2×,40 may be 244. A detailed example of HELTF_2×,40 is as follows.

HELTF_2x, 40(−244:2:244) =     [Equation 14]

{+1, −1, −1, −1, −1, −1, +1, +1, −1, −1, +1,

−1, +1, −1, −1, −1, −1, −1, −1, +1, +1, +1,

+1, −1, +1, −1, +1, +1, −1, −1, −1, −1,

−1, +1, +1, −1, −1, +1, −1, +1, −1, +1,

+1, +1, +1, +1, −1, −1, −1, −1, +1, −1,

+1, −1, +1, +1, +1, +1, +1, −1, +1, −1,

−1, +1, −1, +1, −1, −1, +1, +1, +1, +1,

+1, −1, −1, +1, +1, −1, +1, −1, −1, +1,

+1, +1, +1, +1, −1, −1, −1, −1, +1, −1,

+1, −1, −1, −1, −1, −1, −1, −1, +1, +1,

−1, −1, +1, −1, +1, −1, +1, +1, +1, +1,

+1, −1, −1, −1, −1, +1, −1, +1, −1, 0, 0,

0, −1, −1, −1, −1, −1, +1, +1, −1, −1, +1,

−1, +1, −1, −1, −1, −1, −1, +1, −1, +1,

+1, −1, +1, −1, +1, +1, +1, +1, +1, +1,

+1, −1, −1, +1, +1, −1, +1, −1, +1, −1,

−1, −1, −1, −1, +1, −1, +1, +1, −1, +1,

−1, +1, +1, +1, +1, +1, +1, +1, −1, −1,

+1, +1, −1, +1, −1, +1, −1, −1, −1, −1,

−1, +1, +1, −1, −1, +1, −1, +1, −1, −1,

−1, −1, −1, −1, +1, −1, +1, +1, −1, +1,

−1, +1, +1, −1, −1, −1, −1, −1, +1, +1,

−1, −1, +1, −1, +1, −1, +1, +1, +1, +1,

+1, −1, +1, −1, −1, +1, −1, +1, −1, +1}

2-C) 80 MHz

The length of each of negative and positive sequences for HELTF_2×,80 may be 500. A detailed example of HELTF_2×,80 is as follows.

HELTF_2x, 80(−500:2:500) =     [Equation 15]

{+1, +1, −1, +1, +1, +1, −1, +1, +1, +1, +1,

−1, −1, −1, +1, −1, −1, +1, +1, −1, +1, +1,

+1, −1, −1, −1, −1, +1, +1, +1, +1, −1, +1,

+1, +1, −1, +1, −1, −1, +1, −1, −1, −1, +1,

+1, −1, −1, −1, +1, −1, −1, +1, −1, +1, +1,

−1, +1, +1, −1, +1, −1, −1, −1, +1, −1, −1,

−1, −1, −1, −1, −1, +1, +1, −1, +1, +1, +1,

−1, −1, −1, −1, +1, −1, +1, +1, +1, −1, +1,

+1, +1, +1, −1, −1, −1, +1, +1, +1, −1,

−1, +1, +1, +1, −1, +1, +1, −1, +1, −1,

−1, −1, −1, +1, −1, −1, −1, +1, −1, +1,

+1, −1, +1, +1, −1, −1, −1, +1, −1, −1,

−1, +1, −1, +1, +1, −1, +1, +1, +1, −1,

−1, +1, +1, +1, −1, +1, +1, −1, +1, −1,

−1, +1, −1, +1, +1, +1, −1, +1, +1, +1,

+1, −1, −1, −1, −1, −1, +1, −1, +1, −1,

+1, +1, +1, −1, −1, −1, −1, +1, +1, +1,

−1, −1, −1, −1, +1, −1, −1, −1, +1, −1,

+1, +1, −1, +1, −1, +1, +1, +1, −1, +1,

+1, −1, −1, −1, −1, −1, −1, +1, +1, +1,

−1, −1, +1, +1, −1, +1, +1, −1, +1, +1,

+1, −1, −1, +1, −1, −1, −1, +1, −1, −1,

+1, −1, +1, −1, −1, −1, +1, +1, +1,

+1, −1, +1, −1, −1, −1, +1, −1, −1, −1,

-continued

−1, +1, +1, +1, +1, −1, −1, −1, +1, +1,

+1, 0, 0, 0, +1, −1, −1, +1, +1, −1, +1, −1,

−1, −1, +1, +1, +1, +1, −1, +1, +1, +1, −1,

+1, −1, −1, −1, −1, +1, +1, +1, −1, +1,

+1, −1, −1, +1, −1, −1, +1, −1, −1, +1, −1,

+1, +1, +1, −1, +1, +1, +1, +1, −1, +1, −1,

−1, +1, −1, −1, −1, +1, +1, −1, −1, −1, +1,

−1, +1, +1, +1, −1, +1, +1, +1, +1, −1,

−1, −1, +1, +1, +1, +1, −1, −1, −1, +1, −1,

−1, +1, +1, −1, +1, +1, +1, −1, −1, −1, −1,

+1, −1, −1, −1, +1, −1, +1, +1, −1, +1, −1,

−1, +1, −1, −1, −1, +1, +1, −1, −1, −1, +1,

−1, −1, +1, −1, +1, +1, −1, +1, +1, +1,

−1, +1, −1, +1, +1, −1, +1, −1, −1, −1, +1,

−1, −1, −1, −1, +1, −1, +1, +1, −1, +1, +1,

+1, −1, −1, +1, +1, +1, −1, −1, −1, +1,

+1, +1, +1, −1, +1, +1, +1, −1, +1, −1,

−1, −1, −1, +1, +1, −1, +1, +1, −1,

−1, +1, −1, −1, −1, −1, +1, −1, −1, −1,

+1, −1, +1, −1, +1, +1, −1, +1, −1,

−1, +1, −1, −1, +1, +1, −1, −1, −1,

+1, −1, −1, +1, −1, +1, +1, +1, −1, +1,

+1, +1, +1, −1, −1, −1, +1, +1, +1,

−1, +1, +1, −1, −1, +1, −1, −1, −1, +1,

+1, +1, +1, −1, +1, +1, +1, −1, +1, +1}

2-D) 80+80 MHz/160 MHz

The length of each of negative and positive sequences for HELTF_2×,160 may be 1012. A detailed example of HELTF_2×,160 is as follows.

HELTF_2×,160(−1012:2:1012)=[HELTF_2×,80_primary,zeros(1,11),HELTF_2×,80_secondary]

HELTF_2×,80_primary=[{$1^{st}$ 242-RU},{$2^{nd}$ 242-RU},{central 26-RU},{$3^{rd}$ 242-RU},{$4^{th}$ 242-RU}]

HELTF_2×,80_secondary=[{$1^{st}$ 242-RU},(−1)*{$2^{nd}$ 242-RU},{central 26-RU},{$3^{rd}$ 242-RU},(−1)*{$4^{th}$ 242-RU}]  [Equation 16]

In Equation 16, "zeros(1,11)" means that a sequence element "0" is inserted into frequency indices "1" and "11." The above display method is applied to the following equation in the same manner.

Furthermore, a detailed example of HELTF_2×,80+80 is as follows.

HELTF_2×,80+80=[HELTF_2×,80_primary, HELTF_2×,80_secondary]

HELTF_2×,80_primary=[{$1^{st}$ 242-RU},{$2^{nd}$ 242-RU},{central 26-RU},{3rd 242-RU},{$4^{th}$ 242-RU}]

HELTF_2×,80_secondary=[{$1^{st}$ 242-RU},(−1)*{$2^{nd}$ 242-RU},{central 26-RU},{$3^{rd}$ 242-RU},(−1)*{$4^{th}$ 242-RU}]  [Equation 17]

Example (3)—4× HE-LTF

An example of a 4× HE-LTF is proposed. More specifically, the following example (3) proposes a variety of types of LTF sequences for 20 MHz, 40 MHz and 80 MHz transmission.

3-A) 20 MHz

In the case of the 4× HE LTF, the size of an applied FFT block is increased every four times compared to the VHT LTF. The length of each of negative and positive sequences for HELTF_4×,20 may be 122. A detailed example of HELTF_4×,20 is as follows.

HELTF_4×, 20(−122:1:122) =  [Equation 18]

{−1, −1, +1, −1, +1, −1, +1, +1, +1, −1, +1,

+1, +1, −1, −1, +1, −1, −1, −1, −1, −1, +1,

+1, −1, −1, −1, −1, +1, +1, −1, +1, −1, +1,

+1, +1, +1, −1, +1, −1, −1, +1, +1, −1, +1,

+1, +1, +1, −1, −1, +1, −1, −1, −1, +1,

+1, +1, +1, −1, +1, +1, −1, −1, −1, −1,

+1, −1, −1, +1, +1, −1, +1, −1, −1, −1,

−1, +1, −1, +1, −1, −1, −1, −1, −1, −1,

+1, +1, −1, −1, −1, −1, +1, −1, −1, −1,

+1, +1, +1, −1, +1, +1, +1, −1, +1, −1,

+1, −1, +1, −1, −1, −1, −1, +1, +1,

+1, −1, −1, −1, +1, −1, +1, +1, +1, 0, 0,

0, −1, +1, −1, +1, −1, +1, +1, −1, +1, +1,

+1, −1, −1, +1, −1, −1, +1, −1, +1, −1, +1,

+1, +1, −1, +1, +1, +1, −1, −1, +1, −1,

−1, −1, −1, −1, +1, +1, −1, −1, −1, −1,

−1, −1, +1, −1, +1, −1, −1, −1, −1, +1,

−1, +1, +1, −1, −1, −1, −1, −1, −1, −1,

+1, +1, −1, +1, +1, +1, +1, +1, +1, +1,

−1, +1, +1, −1, −1, −1, −1, +1, −1, −1,

+1, +1, −1, +1, −1, −1, −1, −1, +1, −1,

+1, −1, −1, +1, +1, +1, +1, −1, −1, +1,

+1, +1, +1, +1, −1, +1, +1, −1, −1, −1,

+1, −1, −1, −1, +1, −1, +1, −1, +1, +1}

3-B) 40 MHz

The length of each of negative and positive sequences for HELTF_4×,40 may be 244. A detailed example of HELTF_4×,40 is as follows.

HELTF_4×, 40(−244:1:244) =  [Equation 19]

{+1, −1, −1, −1, −1, +1, −1, −1, +1, +1, −1,

+1, −1, +1, −1, +1, +1, −1, +1, −1, −1, −1,

-continued

+1, +1, −1, −1, −1, −1, −1, −1, −1, +1, −1,

−1, +1, +1, −1, +1, −1, −1, −1, −1, −1, +1,

−1, +1, +1, +1, −1, −1, +1, +1, +1, −1, −1,

+1, +1, +1, +1, −1, +1, +1, −1, −1, +1, −1,

+1, −1, +1, −1, −1, +1, −1, +1, +1, +1, −1,

−1, +1, +1, +1, −1, −1, −1, −1, +1, −1, −1,

+1, +1, −1, +1, −1, −1, −1, −1, −1, +1, −1,

+1, +1, +1, −1, −1, +1, +1, +1, +1, +1,

+1, +1, +1, −1, +1, +1, −1, −1, +1, −1,

+1, +1, +1, +1, +1, −1, +1, −1, −1, −1,

+1, +1, −1, −1, −1, −1, −1, −1, −1, −1,

+1, −1, −1, +1, +1, −1, +1, −1, +1, −1,

+1, +1, −1, +1, −1, −1, −1, +1, +1, −1,

−1, −1, −1, −1, −1, +1, +1, −1, −1, +1,

+1, −1, +1, −1, −1, −1, −1, −1, +1, −1,

+1, +1, +1, −1, −1, +1, +1, +1, −1, −1,

−1, −1, −1, −1, +1, −1, −1, +1, +1, −1,

+1, −1, +1, −1, +1, +1, −1, +1, −1, −1,

−1, +1, +1, −1, −1, −1, +1, +1, +1, +1, −1,

+1, +1, −1, −1, +1, −1, +1, +1, +1, +1,

+1, −1, +1, −1, −1, −1, +1, +1, −1, −1,

−1, +1, 0, 0, 0, 0, 0, −1, +1, +1, +1, +1,

−1, +1, +1, −1, −1, +1, −1, +1, −1, +1,

−1, −1, +1, −1, +1, +1, +1, −1, −1, +1,

+1, +1, +1, +1, +1, +1, −1, +1, +1, −1, −1,

+1, −1, +1, +1, +1, +1, +1, −1, +1, −1,

−1, −1, +1, +1, −1, −1, −1, +1, +1, −1, −1,

−1, −1, +1, −1, −1, +1, +1, −1, +1, −1,

+1, −1, +1, +1, +1, −1, +1, −1, −1, −1, +1,

+1, −1, −1, −1, +1, +1, +1, +1, −1, +1, +1,

−1, −1, +1, −1, +1, +1, +1, +1, +1, −1, +1,

−1, −1, −1, +1, +1, −1, −1, −1, +1, −1, −1,

−1, −1, +1, −1, −1, +1, +1, −1, +1, −1, +1,

−1, +1, +1, −1, −1, −1, −1, +1, +1, −1,

−1, −1, +1, −1, −1, −1, −1, −1, −1, +1,

+1, −1, +1, −1, +1, +1, −1, −1, +1, −1,

+1, −1, −1, +1, −1, +1, +1, −1, −1, +1, +1,

−1, +1, −1, −1, −1, −1, +1, −1, +1, +1, +1,

−1, +1, −1, +1, −1, +1, +1, −1, +1, −1, −1,

−1, +1, +1, −1, −1, −1, +1, +1, +1, +1, −1,

+1, +1, −1, −1, +1, −1, +1, +1, +1, +1, +1,

−1, +1, −1, −1, −1, +1, +1, −1, −1, −1, −1}

3-C) 80 MHz

The length of each of negative and positive sequences for HELTF_4×,80 may be 500. A detailed example of HELTF_4×,80 is as follows.

HELTF_4x, 80(−500:1:500 ) = [Equation 20]

{+1, +1, −1, +1, −1, +1, −1, −1, −1, +1, −1,

−1, −1, +1, +1, −1, +1, +1, +1, +1, +1, −1,

−1, +1, +1, +1, +1, −1, +1, −1, +1, −1, −1,

+1, +1, −1, +1, +1, +1, −1, −1, +1, −1, −1,

−1, −1, +1, +1, +1, −1, −1, −1, −1, −1, −1,

+1, +1, +1, +1, +1, +1, −1, +1, +1, +1, −1,

+1, +1, −1, −1, −1, +1, −1, +1, −1, −1, +1,

+1, −1, +1, −1, +1, +1, +1, +1, +1, −1, −1,

+1, +1, +1, −1, +1, +1, −1, −1, −1, +1,

−1, +1, +1, −1, +1, +1, −1, +1, −1, −1,

+1, +1, +1, +1, −1, −1, +1, +1, +1, +1,

+1, −1, +1, +1, −1, −1, −1, +1, −1, −1,

−1, +1, −1, +1, −1, +1, +1, −1, −1, −1,

+1, −1, +1, +1, −1, +1, +1, +1, −1, −1,

−1, +1, −1, −1, −1, −1, −1, +1, +1, −1,

−1, −1, −1, +1, −1, +1, −1, +1, −1, −1,

−1, +1, −1, −1, −1, +1, +1, −1, +1, +1,

+1, +1, −1, −1, −1, +1, +1, +1, +1, −1,

+1, +1, +1, +1, +1, +1, +1, −1, +1, +1,

+1, −1, +1, −1, −1, −1, +1, −1, +1, +1,

−1, −1, +1, +1, −1, +1, −1, +1, +1, +1,

+1, −1, −1, −1, +1, +1, −1, +1, +1, +1,

−1, −1, −1, +1, −1, +1, +1, −1, +1, +1,

−1, +1, −1, −1, +1, −1, +1, −1, +1, −1, +1,

+1, +1, −1, +1, +1, +1, −1, −1, +1, −1,

−1, −1, −1, −1, +1, +1, −1, −1, −1, −1, +1,

−1, +1, −1, +1, +1, −1, −1, +1, −1, −1,

−1, +1, +1, −1, +1, +1, +1, +1, −1, −1, −1,

+1, +1, +1, +1, −1, +1, −1, −1, −1, −1,

−1, −1, +1, −1, −1, −1, +1, −1, −1, +1, +1,

+1, −1, +1, −1, +1, +1, −1, −1, +1, −1, +1,

−1, −1, −1, −1, +1, +1, −1, −1, +1, −1, +1,

−1, −1, +1, +1, +1, −1, +1, −1, −1, +1, −1,

−1, −1, +1, +1, +1, −1, +1, −1, −1, −1, −1,

−1, +1, −1, +1, +1, +1, +1, +1, +1, −1, −1,

+1, +1, +1, +1, −1, +1, +1, −1, −1, −1, −1,

+1, −1, −1, −1, +1, −1, +1, −1, +1, +1, −1,

-continued
+1, −1, +1, −1, +1, +1, +1, −1, +1, +1, +1,

−1, −1, +1, −1, −1, −1, −1, −1, +1, +1, −1,

−1, −1, −1, +1, −1, +1, −1, +1, +1, −1, −1,

+1, −1, −1, −1, +1, +1, −1, +1, +1, +1, +1,

−1, −1, −1, +1, +1, +1, +1, −1, −1, +1, +1,

+1, +1, +1, +1, −1, +1, +1, +1, −1, +1, +1,

−1, −1, −1, +1, −1, +1, −1, −1, +1, +1, −1,

+1, −1, +1, +1, +1, +1, +1, −1, −1, +1, +1,

+1, −1, +1, +1, −1, −1, −1, +1, −1, +1, +1,

−1, +1, +1, −1, +1, −1, −1, −1, +1, −1, +1,

−1, −1, −1, −1, +1, +1, +1, −1, −1, +1, 0, 0, 0, 0, 0, +1, −1, −1, −1, −1, −1, −1, +1,

−1, +1, +1, −1, −1, +1, +1, −1, +1, −1,

+1, +1, −1, −1, +1, −1, +1, −1, −1, −1,

+1, +1, −1, +1, +1, +1, −1, +1, +1, +1,

+1, +1, +1, +1, −1, +1, −1, −1, +1, −1,

−1, +1, −1, +1, +1, +1, −1, −1, +1, −1,

−1, −1, +1, +1, −1, −1, −1, −1, −1, +1,

−1, −1, −1, −1, −1, +1, +1, −1, −1, −1,

−1, −1, +1, −1, −1, +1, +1, +1, −1, +1,

+1, +1, −1, +1, −1, +1, −1, −1, −1, −1,

−1, +1, +1, +1, −1, −1, −1, −1, +1, −1,

−1, +1, +1, +1, −1, +1, +1, +1, −1, +1,

−1, +1, −1, −1, −1, −1, −1, −1, −1, +1,

+1, −1, −1, −1, +1, −1, −1, +1, +1, +1,

−1, +1, −1, −1, +1, −1, −1, +1, −1, +1,

+1, +1, −1, +1, −1, −1, +1, +1, −1, +1,

−1, +1, +1, +1, −1, −1, +1, +1, −1, −1,

+1, −1, −1, −1, −1, −1, −1, −1, +1, −1,

+1, +1, −1, +1, +1, −1, +1, −1, −1, −1,

+1, +1, −1, +1, +1, +1, −1, −1, +1, +1,

+1, +1, +1, −1, +1, −1, −1, −1, −1, +1,

+1, −1, −1, −1, −1, +1, −1, −1, −1, +1,

+1, +1, −1, +1, +1, +1, −1, +1, −1, +1,

−1, −1, −1, −1, +1, +1, +1, −1, −1, −1,

−1, −1, +1, −1, +1, +1, +1, +1, −1, +1,

+1, −1, −1, +1, −1, +1, −1, +1, +1, +1,

−1, +1, −1, +1, +1, −1, +1, −1, −1, −1,

+1, +1, −1, −1, +1, −1, −1, −1, +1, −1,

−1, −1, −1, −1, +1, −1, +1, +1, −1, +1,

−1, +1, +1, −1, −1, +1, −1, −1, +1, +1,

−1, +1, +1, −1, −1, +1, +1, +1, +1, +1,

+1, −1, +1, +1, +1, +1, +1, −1, −1, +1,

+1, +1, +1, +1, −1, +1, +1, −1, −1, −1,

-continued
+1, −1, −1, −1, +1, −1, +1, −1, +1, +1,

+1, +1, +1, −1, −1, −1, +1, +1, +1, +1,

−1, +1, +1, −1, −1, −1, +1, −1, −1, +1,

+1, −1, +1, −1, +1, −1, −1, −1, −1, −1,

−1, +1, +1, −1, −1, −1, +1, −1, −1, +1,

+1, +1, −1, +1, −1, −1, +1, −1, −1, +1,

−1, +1, −1, +1, −1, +1, −1, −1, +1, +1,

−1, +1, −1, +1, +1, +1, −1, −1, +1, −1,

−1, −1, +1, −1, −1, −1, −1, −1, −1, −1,

+1, −1, +1, +1, −1, +1, +1, −1, +1, −1,

−1, −1, +1, +1, −1, +1, +1, +1, −1, −1,

+1, +1, +1, +1, +1, −1, +1, −1, −1, −1,

−1, +1, +1, −1, −1, −1, −1, +1, −1,

−1, +1, +1, +1, −1, +1, +1, +1, −1, +1,

−1, +1, −1, −1, −1, −1, −1, +1, +1, +1,

−1, −1, −1, −1, +1, −1, −1, +1, +1, +1,

−1, +1, +1, −1, −1, +1, −1, +1, −1, +1}

3-D) 80+80 MHz/160 MHz

The length of each of negative and positive sequences for HELTF_4x,160 may be 1012. A detailed example of HELTF_4x,160 is as follows.

HELTF_4x,160(−1012:2:1012)=[HELTF_4x,80_primary,zeros(1,23),HELTF_4x,80_secondary]

HELTF_4x,80_primary=[HELTF_4x,80_left,0, HELTF_4x,80_right]HELTF_4x,80_secondary= [HELTF_4x,80_left,0,(−1)*HELTF_4x,80_right]    [Equation 21]

In Equation 21, "HELTF_4x,80_left" means a negative sequence for HELTF_4x,80. In Equation 21, "HELTF_4x,80_right" means a positive sequence for HELTF_4x,80. The above display method is applied to the following equation in the same manner.

Furthermore, a detailed example of HELTF_4x,80+80 is as follows.

HELTF_4x,80+80=[HELTF_4x,80_primary, HELTF_4x,80 secondary]    [Equation 22]

There is hereinafter proposed an HE-LTF sequence used when an AP performs transmission if an STA has only the capability of the 20 MHz or 40 MHz band. In this case, it is assumed that the AP transmits data to each STA according to DL OFDMA through a 40 MHz, 80 MHz or 80+80/160 MHz band.

Accordingly, there is proposed a method capable of efficiently transmitting an HE-LTF signal between an STA which receives data using a channel corresponding to a specific 20 MHz or 40 MHz subband and an AP which uses a band wider than that of the STA.

More specifically, an STA having only the capability of the 20 MHz or 40 MHz band may be transmitted through only primary 20 MHz or primary 40 MHz. Furthermore, a specific 20 MHz or 40 MHz subband may be allocated to only an STA having only the capability of 20 MHz or 40 MHz bands.

It may be assumed that the STA having only the capability of the 20 MHz or 40 MHz band is aware of only an HE-LTF sequence corresponding to its own band. In this case, if an AP transmits an OFDMA PPDU through a greater band, there may occur a problem upon channel estimation because the STA is unaware of an HE-LTF sequence corresponding to a band supported by the AP.

Accordingly, the following scheme is proposed in order to solve a channel estimation problem between an STA and an AP.

For example, when an AP transmits data to each STA according to DL OFDMA through a 40 MHz, 80 MHz or 80+80/160 MHz band, the HE-LTF sequence of a subband allocated to an STA having only the capability of the 20 MHz or 40 MHz band is transmitted using an HE-LTF sequence corresponding to the 20 MHz or 40 MHz band.

Additionally, the PAPR can be reduced by differently applying a phase shift) (0°/180°) to the HE-LTF sequence transmitted by the AP for each subband (2.5/5/10/20/40 MHz). Furthermore, the PAPR can be reduced by applying a phase shift of 180° to only a sequence for an STA having only the capability of the 20 MHz band in an HE-LTF sequence transmitted by an AP.

A detailed example of the embodiment is as follows.

A situation in which an AP transmits data to each STA according to OFDMA using a 2× HE-LTF and 40 MHz is taken into consideration. In this case, if an STA allocated to a specific RU of a second 20 MHz subband has only the capability of the 20 MHz band, an HE-LTF sequence that belongs to HE-LTF sequences for a 40 MHz band and that corresponds to the second 20 MHz subband is substituted with an HE-LTF sequence for the 20 MHz band. The aforementioned procedure may be expressed as in the following equation.

$$\text{HELTF\_2x, 40}(-244:2:\underline{250}) = \quad \text{[Equation 23]}$$

$$\{+1, -1, -1, -1, -1, -1, +1, +1, -1, -1, +1,$$
$$-1, +1, -1, -1, -1, -1, -1, -1, +1, +1, +1,$$
$$+1, -1, +1, -1, +1, +1, -1, -1, -1, -1, -1,$$
$$+1, +1, -1, -1, +1, -1, +1, -1, +1, +1, +1,$$
$$+1, +1, -1, -1, -1, -1, +1, -1, +1, -1, +1,$$
$$+1, +1, +1, +1, -1, +1, -1, -1, +1, -1, +1,$$
$$-1, -1, +1, +1, +1, +1, +1, -1, -1, +1,$$
$$+1, -1, +1, -1, +1, +1, +1, +1, +1, +1,$$
$$-1, -1, -1, -1, +1, -1, +1, -1, -1, -1,$$
$$-1, -1, -1, -1, +1, +1, -1, -1, +1, -1,$$
$$+1, -1, +1, +1, +1, +1, +1, -1, -1, -1,$$
$$-1, +1, -1, +1, -1, 0, \underline{0, 0, 0}, -1, -1, -1,$$
$$\underline{+1, +1, -1, +1, -1, -1, -1, -1, +1, -1, +1,}$$
$$\underline{-1, -1, +1, +1, -1, +1, +1,}$$
$$\underline{+1, +1, +1, -1, +1, -1, +1, -1, -1, +1, +1,}$$
$$\underline{-1, +1, -1, -1, -1, -1, +1,}$$
$$\underline{-1, +1, +1, +1, -1, -1, +1, -1, -1, -1, -1, -1,}$$
$$\underline{+1, -1, -1, -1, +1, +1, +1,}$$
$$\underline{-1, -1, +1, 0, +1, -1, +1, +1, -1, +1, +1, -1,}$$
$$\underline{+1, +1, -1, -1, +1, -1,}$$
$$\underline{+1, +1, +1, +1, -1, +1, -1, +1, +1, -1, -1,}$$
$$\underline{+1, -1, -1, -1, -1, -1,}$$
$$\underline{+1, -1, +1, +1, -1, -1, +1, +1, -1, +1, -1,}$$
$$\underline{-1, -1, -1, +1, -1, +1, +1, +1,}$$
$$\underline{-1, -1, +1, -1, -1, -1, -1, -1, +1, -1, +1\}}$$

In the aforementioned procedure, a 2× HE-LTF sequence for the existing 40 MHz band is the same as that of Equation 14. A 2× HE-LTF sequence for the 20 MHz band is the same as that of Equation 13.

In the HE-LTF sequence of Equation 23, a value corresponding to 246~250 tones needs to be nulled due to a 40 MHz tone plan. Furthermore, if the HE-LTF sequence of Equation 23 is used, there may occur a problem upon channel estimation if an STA other than an STA having only the capability of the 20 MHz band is allocated to a specific RU of a second 20 MHz subband.

In another embodiment, when an AP transmits data to each STA according to DL OFDMA through a 40 MHz, 80 MHz or 80+80/160 MHz band, the HE-LTF sequence of a radio unit (RU) to which an STA having only the capability of the 20 MHz or 40 MHz band is allocated is substituted with an HE-LTF sequence mapped to (corresponding to) an RU in the 20 MHz or 40 MHz band and transmitted.

In the 11ax system, an actual RU to which an STA having only the capability of a 20 MHz (or 40 MHz) band may be allocated in 40/80/160/80+80 MHz bandwidths is limited. Accordingly, in order to prevent the deterioration of channel estimation, it is necessary to replace and use a sequence for an RU to which an STA having only the capability of a specific band can be actually allocated.

Additionally, the PAPR can be reduced by differently applying a phase shift) (0°/180°) to an HE-LTF sequence transmitted by an AP for each subband (2.5/5/10/20/40 MHz). Furthermore, the PAPR can be reduced by applying a phase shift of 180° to only a sequence for an STA having only the capability of the 20 MHz band in an HE-LTF sequence transmitted by an AP.

A detailed example of the embodiment is as follows.

A situation in which an AP transmits data to each STA according to OFDMA using a 2× HE-LTF and 40 MHz is taken into consideration. In this case, if an STA allocated to the second 106-RU of a second 20 MHz subband has only the capability of the 20 MHz band, an HE-LTF sequence that belongs to HE-LTF sequences for the 40 MHz band and that corresponds to the second 106-RU of the second 20 MHz subband is substituted with an HE-LTF sequence that belongs to an HE-LTF sequence for the 20 MHz band and that corresponds to the second 106-RU. The aforementioned procedure may be expressed as in the following equation.

$$\text{HELTF\_2x, 40}(-244:2:244) = \quad \text{[Equation 24]}$$

$$\{+1, -1, -1, -1, -1, -1, +1, +1, -1, -1, +1,$$
$$-1, +1, -1, -1, -1, -1, -1, -1, +1, +1, +1,$$
$$+1, -1, +1, -1, +1, +1, -1, -1, -1, -1, -1,$$
$$-1, +1, +1, -1, -1, +1, -1, +1, -1, +1,$$
$$+1, +1, +1, +1, -1, -1, -1, -1, +1, -1,$$

-continued

+1, −1, +1, +1, +1, +1, +1, −1, +1, −1,

−1, +1, −1, +1, −1, −1, +1, +1, +1, +1,

+1, −1, −1, +1, +1, −1, +1, −1, +1, +1,

+1, +1, +1, +1, −1, −1, −1, −1, +1, −1,

+1, −1, −1, −1, −1, −1, −1, +1, +1,

−1, −1, +1, −1, +1, −1, +1, +1, +1, +1,

+1, −1, −1, −1, −1, +1, −1, +1, −1, 0, 0,

0, −1, −1, −1, −1, −1, +1, +1, −1, −1, +1,

−1, +1, −1, −1, −1, −1, −1, −1, +1, −1, +1,

+1, −1, +1, −1, +1, +1, +1, +1, +1, +1,

+1, −1, −1, +1, +1, −1, +1, −1, +1, −1,

−1, −1, −1, −1, +1, −1, +1, +1, −1, +1,

−1, +1, +1, +1, +1, +1, +1, +1, −1, −1,

+1, +1, −1, +1, −1, +1, +1, +1, −1, −1,

+1, −1, +1, +1, +1, +1, −1, +1, −1, +1,

+1, −1, −1, +1, −1, −1, −1, −1, −1, +1,

−1, +1, +1, −1, −1, +1, +1, −1, +1, −1,

−1, −1, −1, +1, −1, +1, +1, +1, −1,

−1, +1, −1, −1, −1, −1, −1, +1, −1, +1,

+1}

In the aforementioned procedure, a 2× HE-LTF sequence for the existing 40 MHz band is the same as that of Equation 14. A 2× HE-LTF sequence for the 20 MHz band is the same as that of Equation 13.

In the HE-LTF sequence of Equation 24, the nulling problem generated in the HE-LTF sequence of Equation 23 is not generated. Furthermore, if the HE-LTF sequence of Equation 24 is used, the channel estimation problem is not generated although an STA different from an STA having only the capability of the 20 MHz band is allocated to a specific RU of a second 20 MHz subband.

Furthermore, in the HE-LTF sequence of Equation 24, an embodiment in which a phase shift of 180° is applied to a sequence corresponding to an STA having only the capability of the 20 MHz band is as follows.

HELTF_2x, 40(−244:2:244) = [Equation 25]

{+1, −1, −1, −1, −1, −1, +1, +1, −1, −1, +1,

−1, +1, −1, −1, −1, −1, −1, −1, +1, +1, +1,

+1, −1, +1, −1, +1, +1, −1, −1, −1, −1, −1,

+1, +1, −1, −1, +1, −1, +1, −1, +1, +1, +1,

+1, +1, −1, −1, −1, −1, +1, −1, +1, −1, +1,

+1, +1, +1, +1, −1, +1, −1, −1, +1, −1, +1,

−1, −1, +1, +1, +1, +1, +1, −1, −1, +1, +1,

−1, +1, −1, +1, +1, +1, +1, +1, −1, −1, −1,

−1, −1, +1, −1, +1, −1, −1, −1, −1, −1,

−1, −1, +1, +1, −1, −1, +1, −1, +1, −1,

+1, +1, +1, +1, +1, −1, −1, −1, −1, +1,

−1, +1, −1, 0, 0, 0, −1, −1, −1, −1, −1, +1,

+1, −1, −1, +1, −1, +1, −1, −1, −1, −1,

−1, −1, +1, −1, +1, +1, −1, +1, −1, +1,

+1, +1, +1, +1, +1, +1, −1, −1, +1, +1,

−1, +1, −1, +1, −1, −1, −1, −1, −1, +1,

−1, +1, +1, −1, +1, −1, +1, +1, +1, +1,

+1, +1, +1, −1, −1, +1, +1, −1, +1, −1, +1,

−1*[+1, +1, −1, −1, +1, −1, +1, +1, +1,

+1, −1, +1, −1, +1, +1, −1, −1, +1,

−1, −1, −1, −1, −1, +1, −1, +1, +1,

−1, −1, +1, +1, −1, +1, −1, −1, −1,

−1, +1, −1, +1, +1, +1, −1, −1, +1,

−1, −1, −1, −1, −1, +1, −1, +1], +1}

In yet another embodiment, when an AP transmits data to each STA according to DL OFDMA through a 40 MHz, 80 MHz or 80+80/160 MHz band, the HE-LTF sequence of an RU to which an STA having only the capability of the 20 MHz or 40 MHz band is applied is substituted with an HE-LTF sequence mapped to (corresponding to) a corresponding tone index of the 20 MHz or 40 MHz band and transmitted.

Additionally, the PAPR can be reduced by differently applying a phase shift) (0°/180°) to an HE-LTF sequence transmitted by an AP for each subband (2.5/5/10/20/40 MHz). Furthermore, the PAPR can be reduced by applying a phase shift of 180° to only a sequence for an STA having only the capability of the 20 MHz band in an HE-LTF sequence transmitted by an AP.

A detailed example of the embodiment is as follows.

A situation in which an AP transmits data to each STA according to OFDMA using 2× HE-LTF and 40 MHz is taken into consideration. In this case, if an STA allocated to the second 106-RU of a second 20 MHz subband has only the capability of the 20 MHz band, an HE-LTF sequence that belongs to HE-LTF sequences for the 40 MHz band and that corresponds to the second 106-RU of the second 20 MHz subband is substituted with an HE-LTF sequence that belongs to HE-LTF sequences for the 20 MHz band and that corresponds to a tone index corresponding to the second 106-RU.

More specifically, the tone index of the second 106-RU of the second 20 MHz subband in the HE-LTF sequences for the 40 MHz band is 138~243. The tone index of a 20 MHz band corresponding to the tone indices 138~243 of the second 106-RU in the HE-LTF sequences for the 20 MHz band is 10~115. Accordingly, an HE-LTF sequence that belongs to the HE-LTF sequences for the 40 MHz band and that is mapped to the tone indices 138~243 of the second 106-RU of the second 20 MHz subband is substituted with an HE-LTF sequence mapped to the tone indices 10~115 of the 20 MHz band.

The aforementioned procedure may be expressed as in the following equation.

$$\text{HELTF\_2x, 40}(-244:2:244) = \quad \text{[Equation 26]}$$

{+1, −1, −1, −1, −1, −1, +1, +1, −1, −1, +1,

−1, +1, −1, −1, −1, −1, −1, −1, +1, +1, +1,

+1, −1, +1, −1, +1, +1, −1, −1, −1, −1, −1,

+1, +1, −1, −1, +1, −1, +1, −1, +1, +1, +1,

+1, +1, −1, −1, −1, −1, +1, −1, +1, −1, +1,

+1, +1, +1, +1, −1, +1, −1, −1, +1, −1, +1,

−1, −1, +1, +1, +1, +1, +1, −1, −1, +1, +1,

−1, +1, −1, +1, +1, +1, +1, +1, +1, −1, −1,

−1, −1, +1, −1, +1, −1, −1, −1, −1, −1,

−1, −1, +1, +1, −1, −1, +1, −1, +1, −1,

+1, +1, +1, +1, +1, −1, −1, −1, −1, +1,

−1, +1, −1, 0, 0, 0, −1, −1, −1, −1, −1, +1,

+1, −1, −1, +1, −1, +1, −1, −1, −1, −1,

−1, −1, +1, −1, +1, +1, −1, +1, −1, +1,

+1, +1, +1, +1, +1, +1, −1, −1, +1, +1,

−1, +1, −1, +1, −1, −1, −1, −1, −1, +1,

−1, +1, +1, −1, +1, −1, +1, +1, +1, +1,

+1, +1, +1, −1, −1, +1, +1, −1, +1, −1, +1,

<u>+1, +1, −1, −1, +1,−1, +1, +1, +1, +1, −1,</u>

<u>+1, −1, +1,+1,−1, −1, +1, −1,−1, −1,</u>

<u>−1, −1, +1, −1, +1, +1, −1, −1, +1, +1, −1,</u>

<u>+1, −1, −1, −1, −1, +1,</u>

<u>−1,+1,+1,+1, −1, −1, +1,−1,</u>

<u>−1,−1,−1,−1,+1, −1, +1, + 1}</u>

In the aforementioned procedure, a 2× HE-LTF sequence for the existing 40 MHz band is the same as that of Equation 14. A 2× HE-LTF sequence for the 20 MHz band is the same as that of Equation 13.

In the HE-LTF sequence of Equation 26, the nulling problem generated in the HE-LTF sequence of Equation 23 is not generated. Furthermore, if the HE-LTF sequence of Equation 26 is used, the channel estimation problem is not generated although an STA other than an STA having only the capability of the 20 MHz band is allocated to a specific RU of the second 20 MHz subband.

Furthermore, in the HE-LTF sequence of Equation 26, an embodiment in which a phase shift of 180° is applied to a sequence corresponding to an STA having only the capability of the 20 MHz band is as follows.

$$\text{HELTF\_2x, 40}(-244:2:244) = \quad \text{[Equation 27]}$$

{{+1, −1, −1, −1, −1, −1, +1, +1, −1, −1, +1,

−1, +1, −1, −1, −1, −1, −1, −1, +1, +1, +1,

+1, −1, +1, −1, +1, +1, −1, −1, −1, −1, −1,

+1, +1, −1, −1, +1, −1, +1, −1, +1, +1, +1,

+1, +1, −1, −1, −1, −1, +1, −1, +1, −1, +1,

+1, +1, +1, +1, −1, +1, −1, −1, +1, −1, +1,

−1, −1, +1, +1, +1, +1, +1, −1, −1, +1,

+1, −1, +1, −1, +1, +1, +1, +1, +1, +1,

−1, −1, −1, −1, +1, −1, +1, −1, −1, −1,

−1, −1, −1, −1, +1, +1, −1, −1, +1, −1,

+1, −1, +1, +1, +1, +1, +1, −1, −1, −1,

−1, +1, −1, +1, −1, 0, 0, 0, −1, −1, −1, −1,

−1, +1, +1, −1, −1, +1, −1, +1, −1, −1,

−1, −1, −1, −1, +1, −1, +1, +1, −1, +1,

−1, +1, +1, +1, +1, +1, +1, +1, −1, −1,

+1, +1, −1, +1, −1, +1, −1, −1, −1, −1,

−1, +1, −1, +1, +1, −1, +1, −1, +1, +1,

+1, +1, +1, +1, +1, −1, −1, +1, +1, −1,

+1, −1, +1, <u>−1*[−1, +1, +1, −1, +1, +1,</u>

<u>−1, −1, +1, −1, +1, +1, +1, +1, −1,</u>

<u>+1, −1, +1,+1,−1, −1, +1, −1,−1, −1,</u>

<u>−1, −1, +1, −1, +1, +1, −1, −1, +1, +1, −1,</u>

<u>+1, −1, −1, −1, −1, +1,−1,</u>

<u>+1,+1,+1, −1, −1, +1,−1,−1,−1,−1], + 1}</u>

In this case, when an AP transmits data to each STA according to DL OFDMA through a 40 MHz, 80 MHz or 80+80/160 MHz band, a sequence substitution method and a phase shift application method for an STA having only the capability of the 20 MHz or 40 MHz band may not be good from a viewpoint of the PAPR.

Accordingly, another embodiment proposes a scheme using an HE-LTF sequence according to a band in which DL OFDMA is transmitted without substituting a sequence. In this case, an STA having only the capability of the 20 MHz or 40 MHz band needs to be aware of information about a wide bandwidth sequence. The information may be transmitted through the signaling of an AP, but there is proposed that an STA having only the capability of the 20 MHz or 40 MHz band has the information because the information has very great overhead. Alternatively, there is proposed that the STA has only information about the HE-LTF sequence of an RU portion that may be actually allocated.

A detailed example of the embodiment is as follows.

First, if an STA having only the capability of the 20 MHz band has all of pieces of HE-LTF sequence information, the overhead of all of the pieces of HE-LTF sequence information is as follows.

A 20 MHz HE-LTF sequence: 53 bytes (60+122+242 bits)

A 40 MHz HE-LTF sequence: 106 bytes (122+242+484 bits)

An 80 MHz HE-LTF sequence: 218 bytes (250+498+996 bits)

Accordingly, an STA having only the capability of the 20 MHz band has the overhead of a total of 377 bytes for all of the pieces of HE-LTF sequence information.

In this case, an RU in which an STA having only the capability of an actual 20 MHz band may be allocated in a wide bandwidth is limited due to the guard tone and DC tone of the 20 MHz band. Accordingly, only RUs that may be actually allocated may be shown as in FIGS. 13 and 14.

Figure 13:
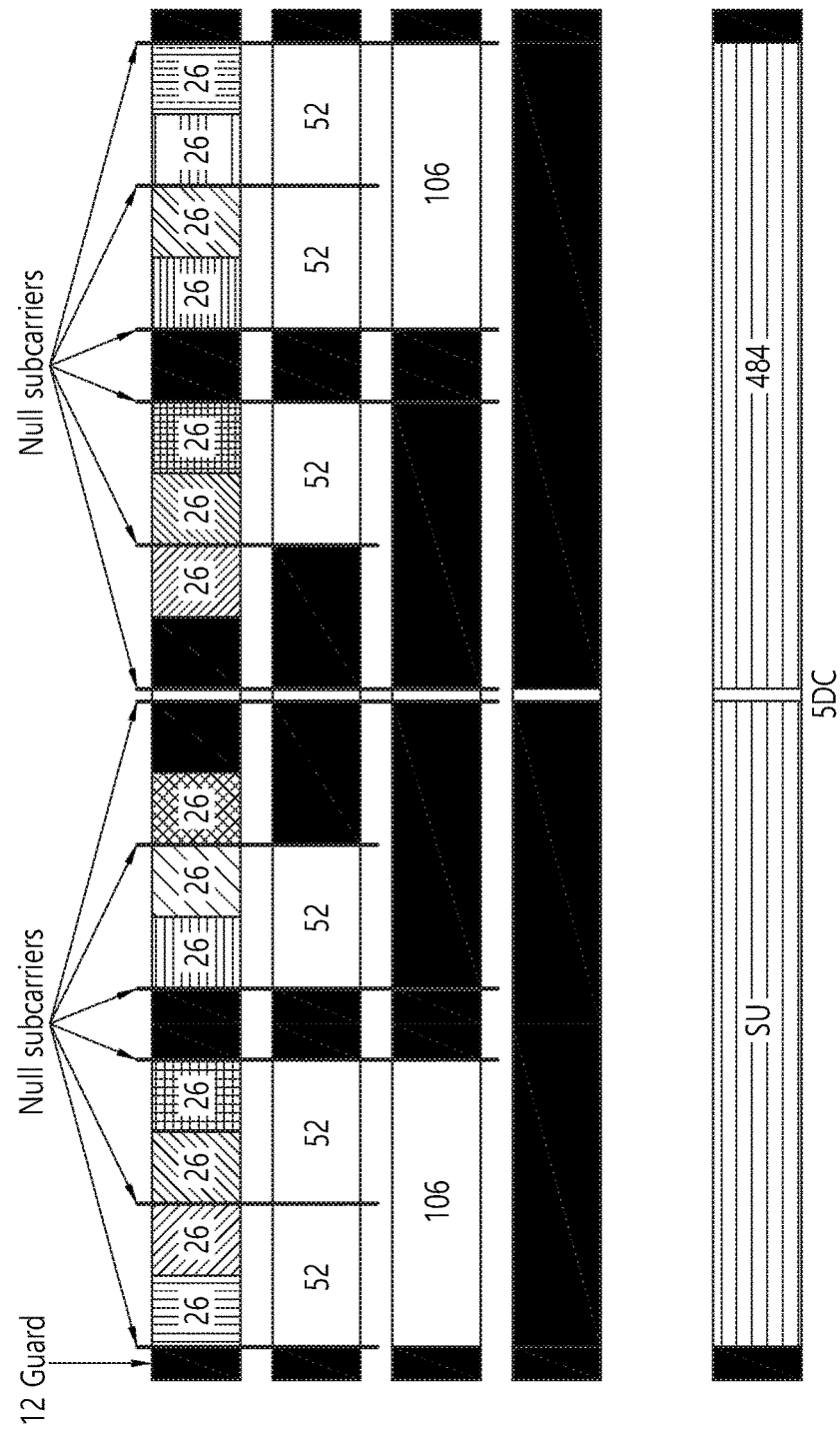
FIG. 13 shows an example of an RU in which an STA having only the capability of the 20 MHz band may be allocated in a tone plan of a 40 MHz band according to the present embodiment.

FIG. 13 shows an example of RUs to which an STA having only the capability of the 20 MHz band may be allocated in the tone plan of the 40 MHz band according to the present embodiment.

Figure 14:
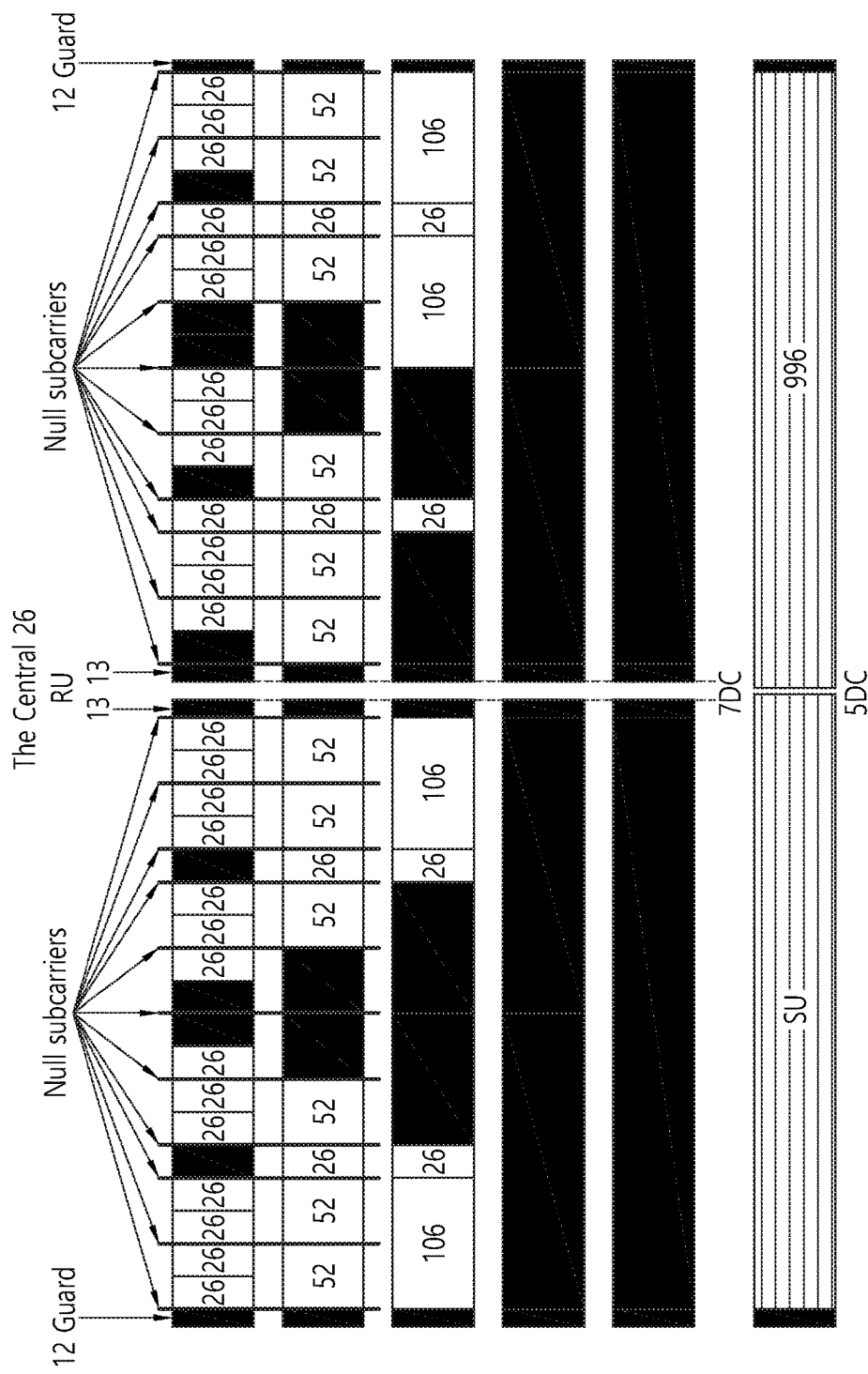
FIG. 14 shows an example of an RU in which an STA having only the capability of the 20 MHz band may be allocated in a tone plan of an 80 MHz band according to the present embodiment.

Referring to FIG. 13, next RUs may not be allocated.
26 RUs: 5, 9, 10, 14, 19, 20, 21, $22^{nd}$ RUs
52 RUs: 4, $5^{th}$ RUs
106 RUs: 2, $3^{rd}$ RUs
All of 242 RUs FIG. 14 shows an example of RUs to which an STA having only the capability of the 20 MHz band may be allocated in the tone plan of the 80 MHz band according to the present embodiment.

Referring to FIG. 14, next RUs may not be allocated.
26 RUs: 5, 9, 10, 14, 19, 24, 28, 29, $33^{rd}$ RU
52 RUs: 4, 5, 12, $13^{th}$ RUs
106 RUs: 2, 3, 5, $6^{th}$ RUs
All of 242, 484 RUs In FIGS. 13 and 14, the overhead of information about the HE-LTF sequence of an RU portion to which an STA having only the capability of the 20 MHz band may be actually allocated is as follows.

A 20 MHz HE-LTF sequence: 53 bytes (60+122+242 bits)
A 40 MHz HE-LTF sequence: about 80 bytes (90+182+ 364 bits)
An 80 MHz HE-LTF sequence: 159 bytes (180+364+728 bits)

Accordingly, an STA having only the capability of the 20 MHz band has the overhead of a total of 292 bytes for information about the HE-LTF sequence of an RU portion that may be actually allocated.

In this case, there is an advantage in that total overhead is reduced because an STA having only the capability of the 20 MHz band does not need to be aware of all of pieces of HE-LTF sequence information although a wide bandwidth is allocated.

Figure 15:
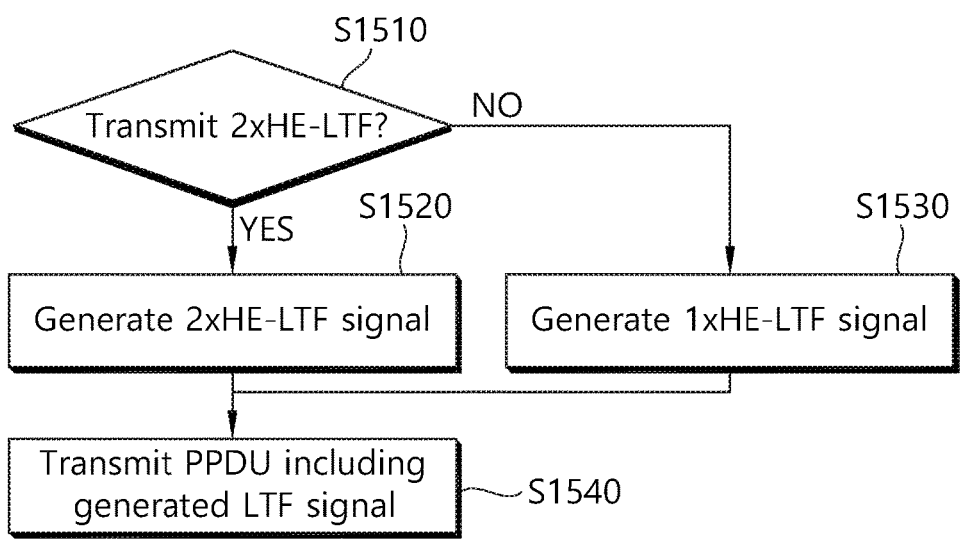
FIG. 15 is a procedural flowchart to which the aforementioned example may be applied.

FIG. 15 is a procedural flowchart to which the aforementioned example may be applied.

The example of FIG. 15 may be applied to various transmission apparatuses. For example, the transmission apparatus may correspond to an AP STA or a non-AP STA. The example of FIG. 15 may be applied to a wireless LAN system which supports a plurality of frequency resource units (RUs) corresponding to different frequency bands.

At step S1510, the transmission apparatus determines whether to transmit a 1× HE-STF signal or a 2× HE STF signal. For example, when the transmission apparatus transmits an uplink PPDU shown in FIG. 12 corresponding to the trigger frame of FIG. 9, the transmission apparatus may transmit the 2× HE STF signal. Otherwise, the transmission apparatus may transmit the 1× HE STF signal.

If the 2× HE-STF is transmitted, the 2× HE-STF may be generated at step S1520. If the 1× HE-STF is transmitted, the 1× HE-STF may be generated at step S1530. In this case, it is assumed that only the 2× HE-STF (i.e., the HE PPDU corresponding to the trigger frame) is transmitted.

For example, the transmission apparatus generates a long training field (LTF) sequence corresponding to a first frequency band (e.g., the 40 MHz band). In this case, an LTF sequence corresponding to the second 106-RU of the second frequency band may be used as a sequence located in the second 106-RU of the second frequency band in the LTF sequence corresponding to the first frequency band.

In this case, the second frequency band may be located in the second subband of the first frequency band. Furthermore, the reception apparatus may have only the capability of the second frequency band. The 106-RU may be a frequency RU including 106 subcarriers. In this case, the first and the second may be determined in order of lower tone index in the first frequency band and the second frequency band.

In other words, the sequence located in the second 106-RU of the second subband of the first frequency band may be substituted with an LTF sequence corresponding to the second 106-RU of the second frequency band.

If the bandwidth of the first frequency band is 40 MHz and the bandwidth of the second frequency band is 20 MHz, an LTF sequence corresponding to the first frequency band may be defined as follows.

$$\{+1, -1, -1, -1, -1, -1, +1, +1, -1, -1, +1, -1, +1, -1,$$
$$-1, -1, -1, -1, -1, +1, +1, +1, +1, -1, +1, -1, +1, +1,$$
$$-1, -1, -1, -1, -1, +1, +1, -1, -1, +1, -1, +1, -1, +1,$$
$$+1, +1, +1, +1, -1, -1, -1, -1, +1, -1, +1, -1, +1, +1,$$
$$+1, +1, +1, -1, +1, -1, -1, +1, -1, +1, -1, -1, +1, +1,$$
$$+1, +1, +1, -1, -1, +1, +1, -1, +1, -1, +1, +1, +1,$$
$$+1, +1, +1, -1, -1, -1, -1, +1, -1, +1, -1, -1, -1,$$
$$-1, -1, -1, -1, +1, +1, -1, -1, +1, -1, +1, -1, +1,$$
$$+1, +1, +1, +1, -1, -1, -1, -1, +1, -1, +1, -1, 0, 0,$$
$$0, -1, -1, -1, -1, -1, +1, +1, -1, -1, +1, -1, +1, -1,$$
$$-1, -1, -1, -1, -1, +1, -1, +1, +1, -1, -1, +1, -1, +1,$$
$$+1, +1, +1, +1, +1, -1, -1, +1, +1, -1, +1, -1, +1, -1,$$
$$-1, -1, -1, -1, +1, -1, +1, +1, -1, +1, -1, +1, +1, +1,$$
$$+1, +1, +1, +1, -1, -1, +1, +1, -1, +1, -1, +1, -1+1,$$
$$+1, -1, -1, +1, -1, +1, +1, +1, +1, -1, +1, -1, +1, +1,$$
$$-1, -1, +1, -1, -1, -1, -1, +1, -1, +1, +1, -1,$$
$$-1, +1, +1, -1, +1, -1, -1, -1, -1, +1, -1, +1, +1,$$
$$+1, -1, -1, +1, -1, -1, -1, -1, +1, -1, +1, +1\}$$

The LTF sequence corresponding to the second 106-RU of the second frequency band may be defined as follows.

$$\{+1, +1, -1, -1, +1, -1, +1, +1, +1, +1, -1, +1, -1, +1,$$
$$+1, -1, -1, +1, -1, -1, -1, -1, -1, +1, -1, +1, +1,$$
$$-1, -1, +1, +1, -1, +1, -1, -1, -1, -1, +1, -1, +1,$$
$$+1, +1, -1, -1, +1, -1, -1, -1, -1, +1, -1, +1\}$$

Furthermore, if a phase shift of 180° is applied to the LTF sequence corresponding to the second 106-RU of the second frequency band, the LTF sequence corresponding to the first frequency band may be defined as follows.

$$\{+1, -1, -1, -1, -1, -1, +1, +1, -1, -1, +1, -1, +1, -1,$$
$$-1, -1, -1, -1, -1, +1, +1, +1, +1, -1, +1, -1, +1, +1,$$
$$-1, -1, -1, -1, -1, +1, +1, -1, -1, +1, -1, +1, -1, +1,$$
$$+1, +1, +1, +1, -1, -1, -1, -1, +1, -1, +1, -1, +1, +1,$$
$$+1, +1, +1, -1, +1, -1, -1, +1, -1, +1, -1, -1, +1, +1,$$

-continued

+1, +1, +1, −1, −1, +1, +1, −1, +1, −1, +1, +1, +1,

+1, +1, +1, −1, −1, −1, −1, +1, −1, +1, −1, −1, −1,

−1, −1, −1, −1, +1, +1, −1, −1, +1, −1, +1, −1, +1,

+1, +1, +1, +1, −1, −1, −1, −1, +1, −1, +1, −1, 0, 0,

0, −1, −1, −1, −1, −1, +1, +1, −1, −1, +1, −1, +1, −1,

−1, −1, −1, −1, −1, +1, −1, +1, +1, −1, +1, −1, +1, +1,

+1, +1, +1, +1, +1, −1, −1, +1, +1, −1, +1, −1, +1, −1,

−1, −1, −1, −1, +1, −1, +1, +1, −1, +1, −1, +1, +1,

+1, +1, +1, +1, +1, −1, −1, +1, +1, −1, +1, −1, +1,

−1*[+1, +1, −1, −1, +1, −1, +1, +1, +1, +1, −1, +1, −1, +1,

+1, −1, −1, +1, −1, −1, −1, −1, −1, +1, −1, +1, +1, −1,

−1, +1, +1, −1, +1, −1, −1, −1, −1, +1, −1, +1, +1,

+1, −1, −1, +1, −1, −1, −1, −1, −1, +1, −1, +1], +1}

The LTF sequence corresponding to the first frequency band may be disposed at intervals of 2 tones from the lowest tone having a tone index of −244 to the highest tone having a tone index of +244.

If the 2× HE-STF is transmitted, at least one of the 2× HE-STF signals described in the above example (B) may be used at step S1520.

If the 1× HE-STF is transmitted, the 1× HE-STF signal may be generated at step S1530. In this case, at least one of the 1× HE-STF signals described in the above example (A) may be used.

At step S1540, the generated HF-STF signal is transmitted to a receiver.

Figure 16:
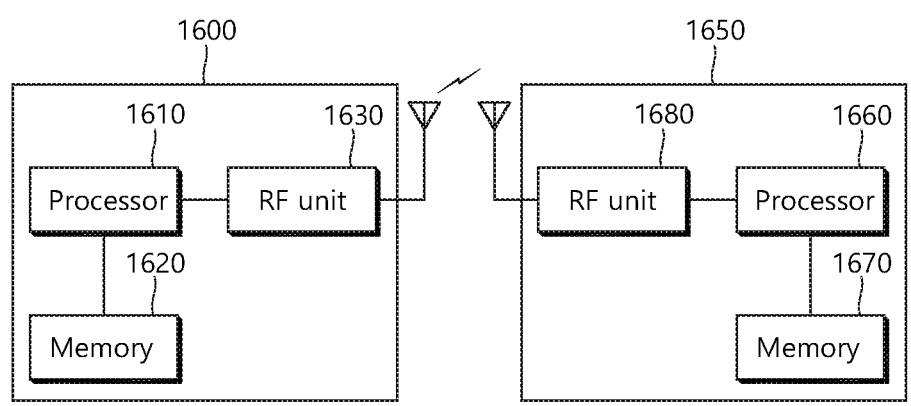
FIG. 16 is a block diagram showing a wireless device to which the exemplary embodiment of the present invention may be applied.

FIG. 16 is a block diagram showing a wireless device to which an exemplary embodiment of the present invention may be applied.

Referring to FIG. 16, the wireless device, that is, a station (STA) capable of implementing the aforementioned exemplary embodiment, may correspond to an AP STA or a non-AP STA. The wireless device may correspond to the aforementioned user or may correspond to a transmission device that sends a signal to the user.

The AP 1600 includes a processor 1610, memory 1620, and a radio frequency (RF) unit 1630.

The RF unit 1630 is connected to the processor 1610 and may send and/or receive a radio signal.

The processor 1610 implements the functions, processes and/or methods proposed in this specification. For example, the processor 1610 may be implemented to perform the operations according to the aforementioned exemplary embodiments of the present invention. More specifically, the processor 1610 may perform the operations capable of being by the AP from among the operations disclosed in the exemplary embodiments of FIGS. 1 to 15.

The non-AP STA 1650 includes a processor 1660, memory 1670, and an RF unit 1680.

The RF unit 1680 is connected to the processor 1660, and may send and/or receive a signal.

The processor 1660 may implement the functions, processes and/or methods proposed in the exemplary embodiment of the present invention. For example, the processor 1660 may be implemented to perform the non-AP STA operations according to the aforementioned exemplary embodiments of the present invention. The processor may perform the operations of the non-AP STA, which are disclosed in the exemplary embodiments of FIGS. 1 to 15.

The processor 1610 and 1660 may include an application-specific integrated circuit (ASIC), other chip sets, a logical circuit, a data processing device and/or a converter which converts a baseband signal into a radio signal and vice versa. The memory 1620 and 1670 may include read-only memory (ROM), random access memory (RAM), flash memory, a memory card, a storage medium and/or other storage devices. The RF unit 1630 and 1680 may include one or more antennas which sends and/or receives a radio signal.

When the exemplary embodiment is implemented in the form of software, the aforementioned method may be implemented in the form of a module (or process, function, and so on) that performs the aforementioned functions. The module may be stored in the memory 1620 and 1670 and may be executed by the processor 1610 and 1660. The memory 1620 and 1670 may be located inside or outside the processor 1610 and 1660 and may be connected to the processor 1610 and 1660 through a diversity of well-known means.

The method according to an example of this specification proposes an example in which an LTF sequence of a new wireless LAN system is configured using an LTF sequence being used in another wireless LAN system.

According to an exemplary of this specification, the present invention has an advantage of reducing a level of complexity in designing an LTF sequence in a new system.

What is claimed is:

1. A method in a wireless LAN system supporting a plurality of frequency resource units (RUs) corresponding to different frequency bands, the method comprising:

generating, by a transmission apparatus, a long training field (LTF) sequence corresponding to a first frequency band; and sending, by the transmission apparatus, an LTF sequence corresponding to the first frequency band to a reception apparatus, wherein an LTF sequence corresponding to a second 106-RU of a second frequency band is used as a sequence located in the second 106-RU of the second frequency band in the LTF sequence corresponding to the first frequency band, and if a bandwidth of the first frequency band is 40 MHz and a bandwidth of the second frequency band is 20 MHz, the LTF sequence corresponding to the first frequency band is defined as follow,

{+1, −1, −1, −1, −1, −1, +1, +1, −1, −1, +1, −1, +1, −1,

−1, −1, −1, −1, −1, +1, +1, +1, +1, −1, +1, −1, +1, +1,

−1, −1, −1, −1, −1, +1, +1, −1, −1, +1, −1, +1, −1, +1,

+1, +1, +1, +1, −1, −1, −1, −1, +1, −1, +1, −1, +1, +1,

+1, +1, +1, −1, +1, −1, −1, +1, −1, +1, −1, −1, +1, +1,

+1, +1, +1, −1, −1, +1, +1, −1, +1, −1, +1, +1, +1,

+1, +1, +1, −1, −1, −1, −1, +1, −1, +1, −1, −1, −1,

−1, −1, −1, −1, +1, +1, −1, −1, +1, −1, +1, −1, +1,

+1, +1, +1, +1, −1, −1, −1, −1, +1, −1, +1, −1, 0, 0,

0, −1, −1, −1, −1, +1, +1, −1, −1, +1, −1, +1, −1,

−1, −1, −1, −1, −1, +1, −1, +1, +1, −1, +1, −1, +1, +1,

+1, +1, +1, +1, +1, −1, −1, +1, +1, −1, −1, +1, −1,

-continued

{−1, −1, −1, −1, +1, −1, +1, +1, −1, +1, −1, +1, +1, +1,

+1, +1, +1, +1, −1, −1, +1, +1, −1, +1, −1, +1, −1 + 1,

+1, −1, −1, +1, −1, +1, +1, +1, +1, −1, +1, −1, +1, +1,

−1, −1, +1, −1, −1, −1, −1, −1, +1, −1, +1, +1, −1,

−1, +1, +1, −1, +1, −1, −1, −1, −1, +1, −1, +1, +1,

+1, −1, −1, +1, −1, −1, −1, −1, −1, +1, −1, +1, +1}, and the 106-RU comprises a frequency RU having 106 subcarriers.

2. The method of claim 1, wherein the LTF sequence corresponding to the first frequency band is disposed at intervals of 2 tones from a lowest tone having a tone index of −244 to a highest tone having a tone index of +244.

3. The method of claim 1, wherein the LTF sequence corresponding to the second 106-RU of the second frequency band is defined as follows.

{+1, +1, −1, −1, +1, −1, +1, +1, +1, +1, −1, +1, −1, +1,

+1, −1, −1, +1, −1, −1, −1, −1, −1, +1, −1, +1, +1,

−1, −1, +1, +1, −1, +1, −1, −1, −1, −1, +1, −1, +1,

+1, +1, −1, −1, +1, −1, −1, −1, −1, −1, +1, −1, +1}.

4. The method of claim 3, wherein if a phase shift of 180° is applied to the LTF sequence corresponding to the second 106-RU of the second frequency band, the LTF sequence corresponding to the first frequency band is defined as follows.

{+1, −1, −1, −1, −1, −1, +1, +1, −1, −1, +1, −1, +1, −1, −1,

−1, −1, −1, −1, +1, +1, +1, +1, −1, +1, −1, +1, +1, −1,

−1, −1, −1, −1, +1, +1, −1, −1, +1, −1, +1, −1, +1, +1,

+1, +1, +1, −1, −1, −1, −1, +1, −1, +1, −1, +1, +1, +1,

+1, +1, −1, +1, −1, −1, +1, −1, +1, −1, −1, +1, +1,

+1, +1, +1, −1, −1, +1, +1, −1, +1, −1, +1, +1, +1,

+1, +1, +1, −1, −1, −1, −1, +1, −1, +1, −1, −1, −1,

−1, −1, −1, −1, +1, +1, −1, −1, +1, −1, +1, −1, +1,

+1, +1, +1, +1, −1, −1, −1, −1, +1, −1, +1, −1, 0, 0,

0, −1, −1, −1, −1, −1, +1, +1, −1, −1, +1, −1, +1, −1,

−1, −1, −1, −1, −1, +1, −1, +1, +1, −1, +1, −1, +1, +1,

+1, +1, +1, +1, +1, −1, −1, +1, +1, −1, +1, −1, +1, −1,

−1, −1, −1, −1, +1, −1, +1, +1, −1, +1, −1, +1, +1,

+1, +1, +1, +1, +1, −1, −1, +1, +1, −1, +1, −1, +1,

−1*[+1, +1, −1, −1, +1, −1, +1, +1, +1, +1, −1, +1, −1, +1,

+1, −1, −1, +1, −1, −1, −1, −1, −1, +1, −1, +1, +1, −1,

−1, +1, +1, −1, +1, −1, −1, −1, −1, +1, −1, +1, +1,

+1, −1, −1, +1, −1, −1, −1, −1, −1, +1, −1, +1], +1}.

5. The method of claim 1, wherein the reception apparatus has only a capability of the second frequency band.

6. The method of claim 1, wherein the second frequency band is located in a second subband of the first frequency band.

7. The method of claim 1, wherein in the LTF sequence corresponding to the first frequency band, a tone is not additionally nulled.

8. A transmission apparatus in a wireless LAN system, comprising:

an RF unit configured to send or receive a radio signal; and a processor configured to control the RF unit, wherein the processor is configured to:

generate a long training field (LTF) sequence corresponding to a first frequency band; and send an LTF sequence corresponding to the first frequency band to a reception apparatus, wherein an LTF sequence corresponding to a second 106-RU of a second frequency band is used as a sequence located in the second 106-RU of the second frequency band in the LTF sequence corresponding to the first frequency band, and if a bandwidth of the first frequency band is 40 MHz and a bandwidth of the second frequency band is 20 MHz, the LTF sequence corresponding to the first frequency band is defined as follow,

{+1, −1, −1, −1, −1, −1, +1, +1, −1, −1, +1, −1, +1, −1,

−1, −1, −1, −1, −1, +1, +1, +1, +1, −1, +1, −1, +1, +1,

−1, −1, −1, −1, −1, +1, +1, −1, −1, +1, −1, +1, −1, +1,

+1, +1, +1, +1, −1, −1, −1, −1, +1, −1, +1, −1, +1, +1,

+1, +1, +1, −1, +1, −1, −1, +1, −1, +1, −1, −1, +1, +1,

+1, +1, +1, −1, −1, +1, +1, −1, +1, −1, +1, +1, +1,

+1, +1, +1, −1, −1, −1, −1, +1, −1, +1, −1, −1, −1,

−1, −1, −1, −1, +1, −1, −1, +1, −1, +1, −1, +1,

+1, +1, +1, +1, −1, −1, −1, −1, +1, −1, +1, −1, 0, 0,

0, −1, −1, −1, −1, +1, +1, −1, −1, +1, −1, +1, −1,

−1, −1, −1, −1, +1, −1, +1, +1, −1, +1, −1, +1, +1,

+1, +1, +1, +1, −1, −1, +1, +1, −1, +1, −1, +1, −1,

−1, −1, −1, +1, −1, +1, +1, −1, +1, −1, +1, +1, +1,

+1, +1, +1, +1, −1, −1, +1, +1, −1, +1, −1, +1, −1 + 1,

+1, −1, −1, +1, −1, +1, +1, +1, +1, −1, +1, −1, +1, +1,

−1, −1, +1, −1, −1, −1, −1, +1, −1, +1, +1, −1,

−1, +1, +1, −1, +1, −1, −1, −1, −1, +1, −1, +1, +1,

+1, −1, −1, +1, −1, −1, −1, −1, −1, +1, −1, +1, +1}, and the 106-RU comprises a frequency RU having 106 subcarriers.

9. The transmission apparatus of claim 8, wherein the LTF sequence corresponding to the second 106-RU of the second frequency band is defined as follows.

{+1, +1, −1, −1, +1, −1, +1, +1, +1, +1, −1, +1, −1,

+1, +1, −1, −1, +1, −1, −1, −1, −1, −1, +1, −1, +1,

-continued

+1, −1, −1, +1, +1, −1, +1, −1, −1, −1, −1, +1, −1, +1,

+1, +1, −1, −1, +1, −1, −1, −1, −1, −1, +1, −1, +1}.

10. The transmission apparatus of claim 9, wherein if a phase shift of 180° is applied to the LTF sequence corresponding to the second 106-RU of the second frequency band, the LTF sequence corresponding to the first frequency band is defined as follows.

{+1, −1, −1, −1, −1, −1, +1, +1, −1, −1, +1, −1, +1, −1, −1,

−1, −1, −1, −1, +1, +1, +1, +1, −1, +1, −1, +1, +1, −1,

−1, −1, −1, −1, +1, +1, −1, −1, +1, −1, +1, −1, +1, +1,

+1, +1, +1, −1, −1, −1, −1, +1, −1, +1, −1, +1, +1, +1,

+1, +1, −1, +1, −1, −1, +1, −1, +1, −1, −1, +1, +1,

+1, +1, +1, −1, −1, +1, +1, −1, +1, −1, +1, +1, +1,

-continued

+1, +1, +1, −1, −1, −1, −1, +1, −1, +1, −1, −1, −1,

−1, −1, −1, −1, +1, +1, −1, −1, +1, −1, +1, −1, +1,

+1, +1, +1, +1, −1, −1, −1, −1, +1, −1, +1, −1, 0, 0,

0, −1, −1, −1, −1, −1, +1, +1, −1, −1, +1, −1, +1, −1,

−1, −1, −1, −1, −1, +1, −1, +1, +1, −1, +1, −1, +1, +1,

+1, +1, +1, +1, +1, −1, −1, +1, +1, −1, +1, −1, +1, −1,

−1, −1, −1, −1, +1, −1, +1, +1, −1, +1, −1, +1, +1,

+1, +1, +1, +1, +1, −1, −1, +1, +1, −1, +1, −1, +1,

−1*[+1, +1, −1, −1, +1, −1, +1, +1, +1, +1, −1, +1, −1, +1,

+1, −1, −1, +1, −1, −1, −1, −1, −1, +1, −1, +1, +1, −1,

−1, +1, +1, −1, +1, −1, −1, −1, −1, +1, −1, +1, +1,

+1, −1, −1, +1, −1, −1, −1, −1, −1, +1, −1, +1], +1}.

* * * * *